US010819999B2

United States Patent
Han et al.

(10) Patent No.: US 10,819,999 B2
(45) Date of Patent: Oct. 27, 2020

(54) INTRA-FRAME PREDICTION METHOD AND APPARATUS

(71) Applicant: Huawei Technologies Co., Ltd., Shenzhen (CN)

(72) Inventors: Yu Han, Shenzhen (CN); Jicheng An, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/697,854

(22) Filed: Nov. 27, 2019

(65) Prior Publication Data

US 2020/0099948 A1   Mar. 26, 2020

Related U.S. Application Data

(63) Continuation of application No. PCT/CN2017/089473, filed on Jun. 22, 2017.

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/11* (2014.11); *H04N 19/132* (2014.11); *H04N 19/159* (2014.11)

(58) Field of Classification Search
None
See application file for complete search history.

(56) References Cited

U.S. PATENT DOCUMENTS

2012/0243606 A1    9/2012   Lainema et al.
2014/0126629 A1    5/2014   Park et al.
(Continued)

FOREIGN PATENT DOCUMENTS

CN    102685474 A    9/2012
CN    103416065 A    11/2013
(Continued)

OTHER PUBLICATIONS

Chuang, T., "Luma Intra Prediction Mode Coding," Joint Collaborative Team on Video Coding of ISO/IEC JTC1/SC29/WG11 and ITU-T SG.16, XP030009085, JCTVC-F062, Jul. 14-22, 2011, 5 pages.

(Continued)

*Primary Examiner* — Talha M Nawaz
(74) *Attorney, Agent, or Firm* — Conley Rose, P.C.

(57) ABSTRACT

A method for decoding an intra-frame prediction mode includes determining a first mode set comprising intra-frame prediction modes of available neighborhood reconstruction units in preset positions of the current to-be-decoded unit and at least one non-directional prediction mode, and parsing the bitstream to obtain a second identifier used to indicate a candidate intra-frame prediction mode in the first mode set that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

20 Claims, 9 Drawing Sheets

(51) Int. Cl.
    *H04N 19/11*       (2014.01)
    *H04N 19/132*      (2014.01)
    *H04N 19/159*      (2014.01)

(56) References Cited

U.S. PATENT DOCUMENTS

| | | | | |
|---|---|---|---|---|
| 2015/0078443 | A1* | 3/2015 | Kolesnikov | H04N 19/18 375/240.03 |
| 2015/0181228 | A1 | 6/2015 | Park | |
| 2015/0249841 | A1* | 9/2015 | Yu | H04N 19/463 375/240.02 |
| 2015/0319459 | A1* | 11/2015 | Zheng | H04N 19/182 375/240.12 |
| 2018/0084284 | A1* | 3/2018 | Rosewarne | H04N 19/91 |
| 2018/0249177 | A1* | 8/2018 | Lin | H04N 19/172 |
| 2018/0324461 | A1* | 11/2018 | Chen | H04N 19/107 |
| 2018/0338139 | A1 | 11/2018 | Guo et al. | |

FOREIGN PATENT DOCUMENTS

| | | |
|---|---|---|
| CN | 103636220 A | 3/2014 |
| CN | 103931195 A | 7/2014 |
| CN | 105357535 A | 2/2016 |
| WO | 2012171463 A1 | 12/2012 |
| WO | 2013074042 A1 | 5/2013 |
| WO | 2016205702 A1 | 12/2016 |

OTHER PUBLICATIONS

Seregin, V., "Neighbor based intra most probable modes list derivation," The Joint Video Exploration Team of ISO/IEC JTC1/SC29/WG11 and ITU-T SG. 16; JVET-C0055, XP030150153, May 17, 2016, 4 pages.

ITU-T H.263, Telecommunication Standardization Sector of ITU, Series H: Audiovisual and Multimedia Systems, Coding of moving video, Implementors Guide for H.263: "Video coding for low bit rate communication", (Aug. 5, 2005), total 10 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

ITU-T H.265(Dec. 2016), Series H: Audiovisual and Multimedia Systems, Infrastructure of audiovisual services—Coding of moving video, High efficiency video coding, Dec. 2016. total 664 pages.

Foreign Communication From a Counterpart Application, PCT Application No. PCT/CN2017/089473, English Translation of International Search Report dated Mar. 14, 2018, 7 pages.

Foreign Communication From a Counterpart Application, PCT Application No. PCT/CN2017/089473, English Translation of Written Opinion dated Mar. 14, 2018, 6 pages.

\* cited by examiner

INTRA-FRAME PREDICTION METHOD AND APPARATUS

CROSS-REFERENCE TO RELATED APPLICATIONS

This application is a continuation of International Patent Application No. PCT/CN2017/089473, filed on Jun. 22, 2017, the disclosure of which is hereby incorporated by reference in its entirety.

TECHNICAL FIELD

This application relates to the field of video image technologies, and in particular, to an intra-frame prediction method and apparatus.

BACKGROUND

Digital video capabilities can be incorporated into a wide range of apparatuses, including digital televisions, digital direct broadcast systems, wireless broadcast systems, personal digital assistants (PDAs), laptop or desktop computers, tablet computers, electronic book readers, digital cameras, digital recording apparatuses, digital media players, video gaming apparatuses, video gaming consoles, cellular or satellite radio telephones, video conferencing apparatuses, video streaming apparatuses, and the like. A digital video apparatus implements video compression technologies, for example, video compression technologies described in standards defined by MPEG-2, MPEG-4, ITU-T H.263, ITU-T H.264/MPEG-4 Part 10: Advanced Video Coding (AVC), and ITU-T H.265: High Efficiency Video Coding (HEVC) standards and extension parts of the standards, to more efficiently transmit and receive digital video information. The video apparatus may transmit, receive, encode, decode, and/or store the digital video information more efficiently by implementing these video encoding/decoding technologies.

SUMMARY

Embodiments of this application provide an intra-frame prediction method and apparatus, so as to select an appropriate method to encode and decode an intra-frame prediction mode, thereby more effectively using prior information obtained in an encoding and decoding process, and improving encoding and decoding efficiency.

A first aspect of this application provides a method for decoding an intra-frame prediction mode, including parsing a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, and parsing the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

A beneficial effect of this implementation is as follows. Lengths of encoded codewords for different candidate intra-frame prediction mode indexes are adjusted, so that a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit. Therefore, encoding efficiency is improved as a distribution probability of each intra-frame prediction mode is better suited.

In a feasible implementation of the first aspect, when it is determined, based on the first identifier, that the intra-frame prediction mode of the current to-be-decoded unit does not belong to the first mode set, the method includes parsing the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and candidate intra-frame prediction modes in the second mode set include directional prediction modes obtained through sampling at a preset direction interval, parsing the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit, and parsing the bitstream to obtain a fifth identifier when it is determined, based on the third identifier, that the intra-frame prediction mode of the current to-be-decoded unit does not belong to the second mode set, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

A beneficial effect of this implementation is as follows. Candidate intra-frame prediction modes that are not in the first mode set are further divided into a candidate intra-frame prediction mode in the second mode set and another candidate intra-frame prediction mode, thereby improving processing efficiency, providing a possibility for encoding compressed index information, and further improving the encoding efficiency.

In a feasible implementation of the first aspect, the candidate intra-frame prediction modes in the first mode set are different from each other, and the candidate intra-frame prediction modes in the second mode set are different from each other.

In a feasible implementation of the first aspect, the directional prediction modes include prediction modes represented by a plurality of prediction directions that are distributed at equal angular intervals between any two directions of 180 degrees on a two-dimensional plane.

In a feasible implementation of the first aspect, the non-directional prediction modes include a direct current (DC) mode and a planar mode.

In a feasible implementation of the first aspect, the available neighborhood reconstruction units in the preset positions of the current to-be-decoded unit include neighborhood reconstruction units, in preset positions, that belong to the same coding unit set as the current to-be-decoded unit and that obtain a predictor through intra-frame prediction.

A beneficial effect of this implementation is as follows. Prior information provided by a spatial correlation in intra-frame prediction is fully used, thereby improving the encoding efficiency.

In a feasible implementation of the first aspect, the coding unit set includes a picture, a slice, or a tile.

In a feasible implementation of the first aspect, the neighborhood reconstruction units in the preset positions include a reconstruction unit that is directly to the left of the current to-be-decoded unit and that is adjacent to a lower-left corner of the current to-be-decoded unit, a reconstruction unit that is directly above the current to-be-decoded unit and that is adjacent to an upper-right corner of the current to-be-decoded unit, a reconstruction unit in a lower-left adjacent position, a reconstruction unit in an upper-right adjacent position, and a reconstruction unit in an upper-left adjacent position.

In a feasible implementation of the first aspect, after it is determined, based on the first identifier, that the intra-frame prediction mode of the current to-be-decoded unit belongs to the first mode set, the method further includes constructing the first mode set in a sequence of an intra-frame prediction mode of the available reconstruction unit that is directly to the left of the current to-be-decoded unit and that is adjacent to the lower-left corner of the current to-be-decoded unit, an intra-frame prediction mode of the available reconstruction unit that is directly above the current to-be-decoded unit and that is adjacent to the upper-right corner of the current to-be-decoded unit, the planar prediction mode, an intra-frame prediction mode of the available reconstruction unit on the lower left of the current to-be-decoded unit, an intra-frame prediction mode of the available reconstruction unit on the upper right of the current to-be-decoded unit, an intra-frame prediction mode of the available reconstruction unit on the upper left of the current to-be-decoded unit, and the direct current mode, until a quantity of candidate intra-frame prediction modes in the first mode set reaches a first preset value, where the candidate intra-frame prediction modes in the first mode set are different from each other.

In a feasible implementation of the first aspect, after the construction of the first mode set is completed, and when the quantity of candidate intra-frame prediction modes in the first mode set does not reach the first preset value, the method further includes adding, to the first mode set, an intra-frame prediction mode that represents an adjacent prediction direction of a directional prediction mode in the first mode set.

A beneficial effect of this implementation is as follows. Prior information provided by a spatial correlation in intra-frame prediction is fully used, thereby improving the encoding efficiency.

In a feasible implementation of the first aspect, a unary code is used for the second identifier, where when the candidate intra-frame prediction mode indicated by the second identifier is arranged in a more forward position in the first mode set, a codeword length of the second identifier is shorter.

A beneficial effect of this implementation is as follows. A proper index encoding manner is selected based on a probability feature of the to-be-encoded object, thereby improving encoding efficiency.

In a feasible implementation of the first aspect, the candidate intra-frame prediction modes in the second mode set include an intra-frame prediction mode that represents an adjacent prediction direction of the directional prediction mode in the first mode set.

A beneficial effect of this implementation is as follows. Prior information provided by a spatial correlation in intra-frame prediction is fully used, thereby improving the encoding efficiency.

In a feasible implementation of the first aspect, after it is determined, based on the third identifier, that the intra-frame prediction mode of the current to-be-decoded unit belongs to the second mode set, the method further includes constructing the second mode set using an intra-frame prediction mode with a first direction interval from the directional prediction mode in the first mode set, until a quantity of candidate intra-frame prediction modes in the second mode set reaches a second preset value, where the first direction interval is a non-zero integer.

A beneficial effect of this implementation is as follows. Prior information provided by a spatial correlation in intra-frame prediction is fully used, thereby improving the encoding efficiency.

In a feasible implementation of the first aspect, after the construction of the second mode set is completed, and when the quantity of candidate intra-frame prediction modes in the second mode set does not reach the second preset value, the method further includes adding, to the second mode set, an intra-frame prediction mode with an increased first direction interval from the directional prediction mode in the first mode set, until the quantity of candidate intra-frame prediction modes in the second mode set reaches the second preset value, where an absolute value of the increased first direction interval is greater than an absolute value of the first direction interval.

A beneficial effect of this implementation is as follows. Prior information provided by a spatial correlation in intra-frame prediction is fully used, thereby improving the encoding efficiency.

In a feasible implementation of the first aspect, before the constructing the second mode set using an intra-frame prediction mode with a first direction interval from the directional prediction mode in the first mode set, the method further includes constructing the second mode set using a first non-directional prediction mode, where the first mode set does not include the first non-directional prediction mode.

A beneficial effect of this implementation is as follows. A possibility of irregular textures is considered, and this implementation is used as a supplement to directional prediction, so that the encoding efficiency is improved.

A second aspect of this application provides a method for decoding an intra-frame prediction mode, including parsing a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, parsing the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, parsing the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and parsing the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

A beneficial effect of this implementation is as follows. Prior information provided by a spatial correlation in intra-frame prediction is fully used, thereby improving encoding efficiency.

In a feasible implementation of the second aspect, the candidate intra-frame prediction modes in the first mode set are different from each other, and the candidate intra-frame prediction modes in the second mode set are different from each other.

In a feasible implementation of the second aspect, when it is determined, based on the third identifier, that the intra-frame prediction mode of the current to-be-decoded unit does not belong to the second mode set, the method further includes parsing the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

A beneficial effect of this implementation is as follows. Candidate intra-frame prediction modes that are not in the first mode set are further divided into a candidate intra-frame prediction mode in the second mode set and another candidate intra-frame prediction mode, thereby improving processing efficiency, providing a possibility for encoding compressed index information, and further improving the encoding efficiency.

In a feasible implementation of the second aspect, after it is determined, based on the third identifier, that the intra-frame prediction mode of the current to-be-decoded unit belongs to the second mode set, the method further includes constructing the second mode set using an intra-frame prediction mode with a first direction interval from the directional prediction mode in the first mode set, until a quantity of candidate intra-frame prediction modes in the second mode set reaches a third preset value, where the first direction interval is a non-zero integer.

A beneficial effect of this implementation is as follows. Prior information provided by a spatial correlation in intra-frame prediction is fully used, thereby improving the encoding efficiency.

In a feasible implementation of the second aspect, after the construction of the second mode set is completed, and when the quantity of candidate intra-frame prediction modes in the second mode set does not reach the third preset value, the method further includes adding, to the second mode set, an intra-frame prediction mode with an increased first direction interval from the directional prediction mode in the first mode set, until the quantity of candidate intra-frame prediction modes in the second mode set reaches the third preset value, where an absolute value of the increased first direction interval is greater than an absolute value of the first direction interval.

A beneficial effect of this implementation is as follows. Prior information provided by a spatial correlation in intra-frame prediction is fully used, thereby improving the encoding efficiency.

In a feasible implementation of the second aspect, before the constructing the second mode set using an intra-frame prediction mode with a first direction interval from the directional prediction mode in the first mode set, the method further includes constructing the second mode set using a first non-directional prediction mode, where the first mode set does not include the first non-directional prediction mode.

A beneficial effect of this implementation is as follows. A possibility of irregular textures is considered, and this implementation is used as a supplement to directional prediction, so that the encoding efficiency is improved.

A third aspect of this application provides a method for decoding an intra-frame prediction mode, including collecting statistics about use frequencies of intra-frame prediction modes of available neighborhood reconstruction units in preset positions of a current to-be-decoded unit, parsing a bitstream to obtain a first identifier, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and parsing the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and when a candidate intra-frame prediction mode indicated by the second identifier as the intra-frame prediction mode of the current to-be-decoded unit is more frequently used, a codeword length of the second identifier is shorter.

A beneficial effect of this implementation is as follows. An intra-frame prediction mode of a surrounding reconstructed block is used as prior information, and statistics about more sample information are collected, so that a spatial correlation is more reliable, and the encoding efficiency is improved.

In a feasible implementation of the third aspect, when it is determined, based on the first identifier, that the intra-frame prediction mode of the current to-be-decoded unit does not belong to the first mode set, the method includes parsing the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and parsing the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

A beneficial effect of this implementation is as follows. Prior information provided by a spatial correlation in intra-frame prediction is fully used, thereby improving encoding efficiency.

In a feasible implementation of the third aspect, the candidate intra-frame prediction modes in the first mode set are different from each other, and the candidate intra-frame prediction modes in the second mode set are different from each other.

In a feasible implementation of the third aspect, when it is determined, based on the third identifier, that the intra-frame prediction mode of the current to-be-decoded unit does not belong to the second mode set, the method includes parsing the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

A beneficial effect of this implementation is as follows. Candidate intra-frame prediction modes that are not in the first mode set are further divided into a candidate intra-frame prediction mode in the second mode set and another candidate intra-frame prediction mode, thereby improving processing efficiency, providing a possibility for encoding compressed index information, and further improving the encoding efficiency.

In a feasible implementation of the third aspect, the collecting statistics about use frequencies of intra-frame prediction modes of available neighborhood reconstruction units in preset positions of a current to-be-decoded unit includes obtaining intra-frame prediction modes used by 4×4 luminance reconstruction pixel units adjacent to the current to-be-decoded unit in the available neighborhood reconstruction units in the preset positions of the current to-be-decoded unit, accumulating same intra-frame prediction modes that are obtained, and obtaining an accumulated quantity of each of the plurality of preset candidate intra-frame prediction modes.

In a feasible implementation of the third aspect, the neighborhood reconstruction units in the preset positions include reconstruction units adjacent to the current to-be-decoded unit.

In a feasible implementation of the third aspect, the preset positions further include reconstruction units on an extension line of an upper boundary of the current to-be-decoded unit and an extension line of a left boundary of the current to-be-decoded unit.

A beneficial effect of this implementation is as follows. A statistical sample is more flexibly selected, thereby achieving a balance between algorithm complexity and algorithm reliability.

In a feasible implementation of the third aspect, when (M−N) is less than a fourth preset value, the method further includes adding, to the second mode set, an intra-frame prediction mode with a first direction interval from a directional prediction mode in the first mode set or the second mode set, until a quantity of candidate intra-frame prediction modes in the second mode set reaches the fourth preset value, where the first direction interval is a non-zero integer.

In a feasible implementation of the third aspect, when the quantity of candidate intra-frame prediction modes in the second mode set does not reach the fourth preset value after the intra-frame prediction mode with the first direction interval from the directional prediction mode in the first mode set or the second mode set is added to the second mode set, the method further includes adding, to the second mode set, an intra-frame prediction mode with an increased first direction interval from the directional prediction mode in the first mode set or the second mode set, until the quantity of candidate intra-frame prediction modes in the second mode set reaches the fourth preset value, where an absolute value of the increased first direction interval is greater than an absolute value of the first direction interval.

A beneficial effect of this implementation is as follows. Prior information provided by a spatial correlation in intra-frame prediction is fully used, thereby improving encoding efficiency.

A fourth aspect of this application provides an apparatus for decoding an intra-frame prediction mode, including a parsing unit configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, where the parsing unit is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

In a feasible implementation of the fourth aspect, the candidate intra-frame prediction modes in the first mode set are different from each other, and the candidate intra-frame prediction modes in the second mode set are different from each other.

In a feasible implementation of the fourth aspect, when it is determined, based on the first identifier, that the intra-frame prediction mode of the current to-be-decoded unit does not belong to the first mode set, the parsing unit is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and candidate intra-frame prediction modes in the second mode set include directional prediction modes obtained through sampling at a preset direction interval, parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit, and parse the bitstream to obtain a fifth identifier when it is determined, based on the third identifier, that the intra-frame prediction mode of the current to-be-decoded unit does not belong to the second mode set, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation of the fourth aspect, the directional prediction modes include prediction modes represented by a plurality of prediction directions that are distributed at equal angular intervals between any two directions of 180 degrees on a two-dimensional plane.

In a feasible implementation of the fourth aspect, the non-directional prediction modes include a direct current mode and a planar mode.

In a feasible implementation of the fourth aspect, the available neighborhood reconstruction units in the preset positions of the current to-be-decoded unit include neighborhood reconstruction units, in preset positions, that belong to the same coding unit set as the current to-be-decoded unit and that obtain a predictor through intra-frame prediction.

In a feasible implementation of the fourth aspect, the coding unit set includes a picture, a slice, or a tile.

In a feasible implementation of the fourth aspect, the neighborhood reconstruction units in the preset positions include a reconstruction unit that is directly to the left of the current to-be-decoded unit and that is adjacent to a lower-left corner of the current to-be-decoded unit, a reconstruction unit that is directly above the current to-be-decoded unit and that is adjacent to an upper-right corner of the current to-be-decoded unit, a reconstruction unit in a lower-left adjacent position, a reconstruction unit in an upper-right adjacent position, and a reconstruction unit in an upper-left adjacent position.

In a feasible implementation of the fourth aspect, the apparatus further includes a construction unit. The construction unit is configured to, after it is determined, based on the first identifier, that the intra-frame prediction mode of the current to-be-decoded unit belongs to the first mode set, construct the first mode set in a sequence of an intra-frame prediction mode of the available reconstruction unit that is directly to the left of the current to-be-decoded unit and that is adjacent to the lower-left corner of the current to-be-decoded unit, an intra-frame prediction mode of the available reconstruction unit that is directly above the current to-be-decoded unit and that is adjacent to the upper-right corner of the current to-be-decoded unit, the planar prediction mode, an intra-frame prediction mode of the available reconstruction unit on the lower left of the current to-be-decoded unit, an intra-frame prediction mode of the available reconstruction unit on the upper right of the current to-be-decoded unit, an intra-frame prediction mode of the available reconstruction unit on the upper left of the current to-be-decoded unit, and the direct current mode, until a quantity of candidate intra-frame prediction modes in the first mode set reaches a first preset value, where the candidate intra-frame prediction modes in the first mode set are different from each other.

In a feasible implementation of the fourth aspect, after the construction of the first mode set is completed, and when the quantity of candidate intra-frame prediction modes in the first mode set does not reach the first preset value, the construction unit is further configured to add, to the first mode set, an intra-frame prediction mode that represents an adjacent prediction direction of a directional prediction mode in the first mode set.

In a feasible implementation of the fourth aspect, a unary code is used for the second identifier, where when the candidate intra-frame prediction mode indicated by the second identifier is arranged in a more forward position in the first mode set, a codeword length of the second identifier is shorter.

In a feasible implementation of the fourth aspect, the candidate intra-frame prediction modes in the second mode set include an intra-frame prediction mode that represents an adjacent prediction direction of the directional prediction mode in the first mode set.

In a feasible implementation of the fourth aspect, after it is determined, based on the third identifier, that the intra-frame prediction mode of the current to-be-decoded unit belongs to the second mode set, the construction unit is further configured to construct the second mode set using an intra-frame prediction mode with a first direction interval from the directional prediction mode in the first mode set, until a quantity of candidate intra-frame prediction modes in the second mode set reaches a second preset value, where the first direction interval is a non-zero integer.

In a feasible implementation of the fourth aspect, after the construction of the second mode set is completed, and when the quantity of candidate intra-frame prediction modes in the second mode set does not reach the second preset value, the construction unit is further configured to add, to the second mode set, an intra-frame prediction mode with an increased first direction interval from the directional prediction mode in the first mode set, until the quantity of candidate intra-frame prediction modes in the second mode set reaches the second preset value, where an absolute value of the increased first direction interval is greater than an absolute value of the first direction interval.

In a feasible implementation of the fourth aspect, before constructing the second mode set using the intra-frame prediction mode with the first direction interval from the directional prediction mode in the first mode set, the construction unit is further configured to construct the second mode set using a first non-directional prediction mode, where the first mode set does not include the first non-directional prediction mode.

A fifth aspect of this application provides an apparatus for decoding an intra-frame prediction mode, including a parsing unit configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, where the parsing unit is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, the parsing unit is further configured to parse the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and the parsing unit is further configured to parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In a feasible implementation of the fifth aspect, the candidate intra-frame prediction modes in the first mode set are different from each other, and the candidate intra-frame prediction modes in the second mode set are different from each other.

In a feasible implementation of the fifth aspect, when it is determined, based on the third identifier, that the intra-frame prediction mode of the current to-be-decoded unit does not belong to the second mode set, the parsing unit is further configured to parse the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation of the fifth aspect, the apparatus further includes a construction unit. After it is determined, based on the third identifier, that the intra-frame prediction mode of the current to-be-decoded unit belongs to the second mode set, the construction unit is configured to construct the second mode set using an intra-frame prediction mode with a first direction interval from the directional prediction mode in the first mode set, until a quantity of candidate intra-frame prediction modes in the second mode set reaches a third preset value, where the first direction interval is a non-zero integer.

In a feasible implementation of the fifth aspect, after the construction of the second mode set is completed, and when the quantity of candidate intra-frame prediction modes in the second mode set does not reach the third preset value, the construction unit is further configured to add, to the second mode set, an intra-frame prediction mode with an increased first direction interval from the directional prediction mode in the first mode set, until the quantity of candidate intra-frame prediction modes in the second mode set reaches the third preset value, where an absolute value of the increased first direction interval is greater than an absolute value of the first direction interval.

In a feasible implementation of the fifth aspect, before constructing the second mode set using the intra-frame prediction mode with the first direction interval from the directional prediction mode in the first mode set, the construction unit is further configured to construct the second mode set using a first non-directional prediction mode, where the first mode set does not include the first non-directional prediction mode.

A sixth aspect of this application provides an apparatus for decoding an intra-frame prediction mode, including a statistics collection unit configured to collect statistics about use frequencies of intra-frame prediction modes of available neighborhood reconstruction units in preset positions of a current to-be-decoded unit, and a parsing unit configured to parse a bitstream to obtain a first identifier, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, where the parsing unit is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and when a candidate intra-frame prediction mode indicated by the second identifier as the intra-frame prediction mode of the current to-be-decoded unit is more frequently used, a codeword length of the second identifier is shorter.

In a feasible implementation of the sixth aspect, when it is determined, based on the first identifier, that the intra-frame prediction mode of the current to-be-decoded unit does not belong to the first mode set, the parsing unit is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In a feasible implementation of the sixth aspect, the candidate intra-frame prediction modes in the first mode set are different from each other, and the candidate intra-frame prediction modes in the second mode set are different from each other.

In a feasible implementation of the sixth aspect, when it is determined, based on the third identifier, that the intra-frame prediction mode of the current to-be-decoded unit does not belong to the second mode set, the parsing unit is further configured to parse the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation of the sixth aspect, the statistics collection unit is configured to obtain intra-frame prediction modes used by 4×4 luminance reconstruction pixel units adjacent to the current to-be-decoded unit in the available neighborhood reconstruction units in the preset positions of the current to-be-decoded unit, accumulate same intra-frame prediction modes that are obtained, and obtain an accumulated quantity of each of the plurality of preset candidate intra-frame prediction modes.

In a feasible implementation of the sixth aspect, the neighborhood reconstruction units in the preset positions include reconstruction units adjacent to the current to-be-decoded unit.

In a feasible implementation of the sixth aspect, the preset positions further include reconstruction units on an extension line of an upper boundary of the current to-be-decoded unit and an extension line of a left boundary of the current to-be-decoded unit.

In a feasible implementation of the sixth aspect, when (M–N) is less than a fourth preset value, the construction unit is configured to add, to the second mode set, an intra-frame prediction mode with a first direction interval from a directional prediction mode in the first mode set or the second mode set, until a quantity of candidate intra-frame prediction modes in the second mode set reaches the fourth preset value, where the first direction interval is a non-zero integer.

In a feasible implementation of the sixth aspect, when the quantity of candidate intra-frame prediction modes in the second mode set does not reach the fourth preset value after the intra-frame prediction mode with the first direction interval from the directional prediction mode in the first mode set or the second mode set is added to the second mode set, the construction unit is further configured to add, to the second mode set, an intra-frame prediction mode with an increased first direction interval from the directional prediction mode in the first mode set or the second mode set, until the quantity of candidate intra-frame prediction modes in the second mode set reaches the fourth preset value, where an absolute value of the increased first direction interval is greater than an absolute value of the first direction interval.

A seventh aspect of this application provides an apparatus for decoding an intra-frame prediction mode, including a processor and a memory coupled to the processor, where the processor is configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, and parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

An eighth aspect of this application provides an apparatus for decoding an intra-frame prediction mode, including a processor and a memory coupled to the processor, where the processor is configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, parse the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

A ninth aspect of this application provides an apparatus for decoding an intra-frame prediction mode, including a processor and a memory coupled to the processor, where the processor is configured to collect statistics about use frequencies of intra-frame prediction modes of available neighborhood reconstruction units in preset positions of a current to-be-decoded unit, parse a bitstream to obtain a first identifier, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and when a candidate intra-frame prediction mode indicated by the second identifier as the intra-frame prediction mode of the current to-be-decoded unit is more frequently used, a codeword length of the second identifier is shorter.

In a feasible implementation of the ninth aspect, when it is determined, based on the first identifier, that the intra-frame prediction mode of the current to-be-decoded unit does not belong to the first mode set, the processor is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

A tenth aspect of this application provides a method for encoding an intra-frame prediction mode, including encoding a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, and encoding a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and a codeword length of the second identifier indicating one of the at least one non-directional prediction mode as the intra-frame prediction mode of the current to-be-encoded unit is not less than a codeword length of any second identifier indicating an intra-frame prediction mode of an available neighborhood reconstruction unit in a preset position of the current to-be-encoded unit as the intra-frame prediction mode of the current to-be-encoded unit.

An eleventh aspect of this application provides a method for encoding an intra-frame prediction mode, including encoding a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, encoding a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, encoding a third identifier into the bitstream when it is determined, based on the first identifier, that the intra-frame prediction mode of the current to-be-encoded unit does not belong to the first mode set, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and encoding a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

A twelfth aspect of this application provides a method for encoding an intra-frame prediction mode, including collecting statistics about use frequencies of intra-frame prediction modes of available neighborhood reconstruction units in preset positions of a current to-be-encoded unit, encoding a first identifier into a bitstream, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and encoding a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and when a candidate intra-frame prediction mode indicated by the second identifier as the intra-frame prediction mode of the current to-be-encoded unit is more frequently used, a codeword length of the second identifier is shorter.

In a feasible implementation of the twelfth aspect, when it is determined, based on the first identifier, that the intra-frame prediction mode of the current to-be-encoded unit does not belong to the first mode set, the method includes encoding a third identifier into the bitstream, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and encoding a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

A thirteenth aspect of this application provides an apparatus for encoding an intra-frame prediction mode, including a processor and a memory coupled to the processor, where the processor is configured to encode a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, and encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and a codeword length of the second identifier indicating one of the at least one non-directional prediction mode as the intra-frame prediction mode of the current to-be-encoded unit is not less than a codeword length of any second identifier indicating an intra-frame prediction mode of an available neighborhood reconstruction unit in a preset position of the current to-be-encoded unit as the intra-frame prediction mode of the current to-be-encoded unit.

A fourteenth aspect of this application provides an apparatus for encoding an intra-frame prediction mode, including a processor and a memory coupled to the processor, where the processor is configured to encode a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, encode a third identifier into the bitstream when it is determined, based on the first identifier, that the intra-frame prediction mode of the current to-be-encoded unit does not belong to the first mode set, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and encode a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

A fifteenth aspect of this application provides an apparatus for encoding an intra-frame prediction mode, including a processor and a memory coupled to the processor, where the processor is configured to collect statistics about use frequencies of intra-frame prediction modes of available neighborhood reconstruction units in preset positions of a current to-be-encoded unit, encode a first identifier into a bitstream, where the first identifier is used to indicate that an intra-frame prediction mode of the current to-be-encoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and when a candidate intra-frame prediction mode indicated by the second identifier as the intra-frame prediction mode of the current to-be-encoded unit is more frequently used, a codeword length of the second identifier is shorter.

In a feasible implementation of the fifteenth aspect, when it is determined, based on the first identifier, that the intra-frame prediction mode of the current to-be-encoded unit does not belong to the first mode set, the processor is further configured to encode a third identifier into the bitstream, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and encode a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

A sixteenth aspect of this application provides a computer readable storage medium. The computer readable storage medium stores an instruction, and when the instruction is run on a computer, the computer is enabled to perform the methods according to the foregoing aspects.

A seventeenth aspect of this application provides a computer program product including an instruction, where when the computer program product is run on a computer, the computer is enabled to perform the methods according to the foregoing aspects.

It should be understood that the technical solutions of the fourth aspect to the seventeenth aspect of this application are consistent with those of the first aspect, the second aspect, and the third aspect of this application, and the beneficial effects achieved by all the aspects and the corresponding implementable design manners are similar. Details are not described again.

DESCRIPTION OF EMBODIMENTS

Figure 1:
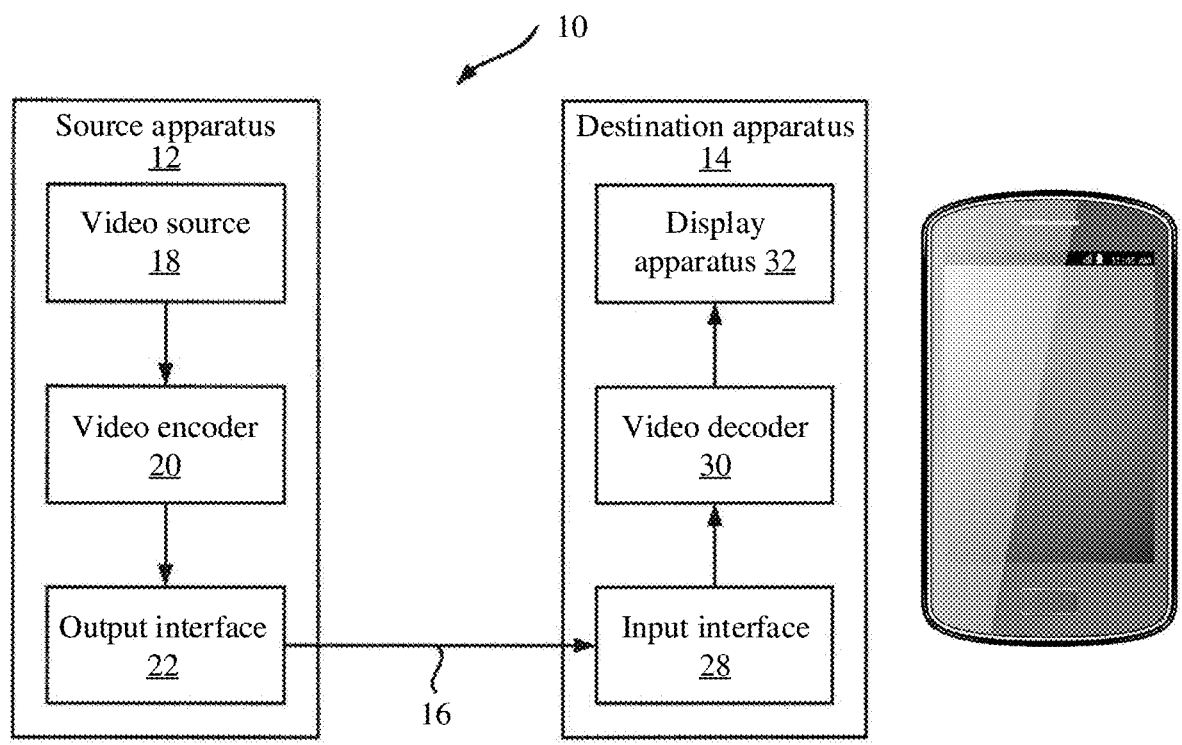
FIG. 1 is a block diagram of a video encoding and decoding system in a feasible implementation of a technology described in an embodiment of this application.

The following clearly and completely describes the technical solutions in the embodiments of this application with reference to the accompanying drawings in the embodiments of this application.

In a feasible implementation, aspects of this application improve construction of a most probable intra-frame prediction mode (MPM) in intra-frame prediction modes and construction of selected intra-frame prediction modes (selected modes). For example, according to some video decoding technologies, a video encoder may construct an MPM set or a set of selected modes before determining and signaling intra-frame prediction information of a currently encoded block, or a video decoder may construct an MPM set or a set of selected modes before determining and receiving intra-frame prediction information of a currently decoded block. The aspects of this application relate to construction of an MPM set or a set of selected modes, so as to select an appropriate method for encoding and decoding intra-frame prediction modes, thereby more effectively using prior information obtained in an encoding and decoding process, and improving encoding and decoding efficiency.

In a feasible implementation, candidate intra-frame prediction modes are classified into intra-frame prediction modes in an MPM set and remaining intra-frame prediction modes. The video encoder may generate a list of MPMs from the MPM set according to an order (for example, a decoding order) in which the MPMs appear in a picture or a slice of video data, and the list includes intra-frame prediction modes. In another feasible implementation, the video decoder may generate a list of MPMs according to an order (referred to as a "check order" in this specification) in which the video encoder checks whether intra-frame modes of neighboring blocks are the same as that of a currently decoded block. The video encoder may signal MPMs based on indexes of the generated list without ordering or reordering the MPMs in the list. The video decoder may perform the same process to generate an MPM list, obtain indexes of the list from an encoded bitstream, and select an MPM from the list based on the indexes without ordering or reordering MPMs in the list. In a feasible implementation, candidate intra-frame prediction modes are classified into intra-frame prediction modes in an MPM set, intra-frame prediction modes in a set of selected modes, and remaining intra-frame prediction modes. The remaining intra-frame prediction modes may also be referred to as intra-frame prediction modes in a set of non-selected modes. A principle used for processing the intra-frame prediction modes in the set of selected modes is the same as that used for processing the intra-frame prediction modes in the MPM set. Details are not described again.

In a feasible implementation, for a purpose of illustration, the video decoder may first check whether an intra-frame mode of a block (referred to as a "left neighboring block" in this specification) located on the left of the currently decoded block is the same as the intra-frame mode of the current block. The video decoder may then check whether an intra-frame mode of a block (referred to as an "upper neighboring block" in this specification) located above the currently decoded block is the same as the intra-frame mode of the current block. In this feasible implementation, according to the aspects of this application, the intra-frame mode of the left neighboring block may have an index of 0 in the MPM list maintained by the video decoder, and the intra-frame mode of the upper neighboring block may have an index of 1 in the list. In this case, the video encoder may signal the index (that is, 0) of the intra-frame mode of the left neighboring block and the index (that is, 1) of the intra-frame mode of the upper neighboring block regardless of whether an actual intra-frame mode number of the left neighboring block (for example, a predefined mode number specified in a video decoding standard) is greater than that of the upper neighboring block. Alternatively, if the video decoder checks the intra-frame mode of the upper neighboring block before checking the intra-frame mode of the left neighboring block, the video encoder may signal the index (that is, 0) of the intra-frame mode of the upper neighboring block and the index (that is, 1) of the intra-frame mode of the left neighboring block. In either case, according to these feasible implementations and aspects of this application, the video encoder may signal indexes of intra-frame modes without reordering or ordering the intra-frame modes in the list. In some feasible implementations, if an intra-frame mode is not an MPM, ordering may be applied to intra-frame mode decoding. In other words, when signaling an intra-frame mode that is not an MPM, the video encoder may sort intra-frame modes in the list or modify the intra-frame modes in the list in another manner. According to the aspects of this application, an order (referred to as the "check order" in this specification) in which the video decoder checks intra-frame modes of neighboring blocks may be implicitly derived based on statistical data collected for intra-frame modes of previously decoded blocks. In other feasible implementations, the video decoder may derive a check order based on availability of neighboring blocks. In a further feasible implementation, the video encoder may signal a clear indication of the check order (and the video decoder may obtain the check order from an encoded bitstream). Likewise, a similar method and similar feasible implementations are used for processing the set of selected modes. Details are not described again.

FIG. 1 is a block diagram of a video encoding and decoding system 10 in a feasible implementation of a technology described in this application. As shown in FIG. 1, the system 10 includes a source apparatus 12, and the source apparatus 12 generates encoded video data to be decoded by a destination apparatus 14. The source apparatus 12 and the destination apparatus 14 may include any of a wide range of apparatuses, including a desktop computer, a laptop computer, a tablet computer, a set-top box, a mobile phone such as a so-called "smart" phone, a so-called "smart" touch panel, a television, a camera, a display apparatus, a digital media player, a video gaming console, a video streaming transmission apparatus, and the like. In some applications, the source apparatus 12 and the destination apparatus 14 may be equipped for wireless communication.

The destination apparatus 14 may receive to-be-decoded encoded video data via a link 16. Any kind of medium or apparatus capable of transmitting the encoded video data from the source apparatus 12 to the destination apparatus 14 may be included on the link 16. In a feasible implementation, a communications medium enabling the source apparatus 12 to directly transmit the encoded video data to the destination apparatus 14 in real time may be included on the link 16. The encoded video data can be modulated according to a communication standard (for example, a wireless communication protocol) and transmitted to the destination apparatus 14. The communications medium may include any wireless or wired communications medium, for example, a radio frequency (RF) spectrum or one or more physical transmission lines. The communications medium may be a part of a packet-based network (for example, a local area network, a wide area network, or a global network of the Internet). The communications medium may include a router, a switch, a base station, or any other device helpful for facilitating communication from the source apparatus 12 to the destination apparatus 14.

Alternatively, encoded data may be output to a storage apparatus 24 through an output interface 22. Similarly, the encoded data may be accessed from the storage apparatus 24 through an input interface. The storage apparatus 24 may include any of a plurality of disperse or local data storage media, for example, a hard disk drive, a BLU-RAY disc, a digital versatile disc (DVD), a compact disc-read only memory (CD-ROM), a flash memory, a volatile or non-volatile storage, or any other appropriate data storage medium used for storing the encoded video data. In another feasible implementation, the storage apparatus 24 may correspond to a file server or another intermediate storage apparatus capable of storing an encoded video data generated by the source apparatus 12. The destination apparatus 14 may access the stored video data from the storage apparatus 24 through streaming transmission or downloading. The file server may be any type of server capable of storing the encoded video data and transmitting the encoded video data in the destination apparatus 14. In a feasible implementation, the file server includes a website server, a file transfer protocol (FTP) server, a network-attached storage (NAS) apparatus, or a local disk drive. The destination apparatus 14 may access the encoded video data through any standard data connection including an Internet connection. The data connection may include a wireless channel (for example, a Wi-Fi connection), a wired connection (for example, a digital subscriber line (DSL) and a cable modem), or a combination thereof, that is suitable for accessing the encoded video data stored in the file server. Transmission of the encoded video data from the storage apparatus 24 may be streaming transmission, downloading transmission, or a combination thereof.

Techniques in this application are not necessarily limited to wireless applications or settings. The techniques can be applied to video decoding, to support any one of a plurality of multimedia applications, for example, over-the-air television broadcasting, cable television transmission, satellite television transmission, streaming video transmission (for example, through the Internet), digital video encoding for storage in a data storage medium, decoding of a digital video stored in a data storage medium, or the like. In some possible implementations, the system 10 may be configured to support unidirectional or bidirectional video transmission, so as to support applications such as streaming video transmission, video playing, video broadcasting, and/or video calling.

In a feasible implementation of FIG. 1, the source apparatus 12 may include a video source 18, a video encoder 20, and the output interface 22. In some applications, the output interface 22 may include a modulator/demodulator (a modem) and/or a transmitter. In the source apparatus 12, the video source 18 may include, for example, the following source devices, a video capturing apparatus (for example, a video camera), a video archive including a previously captured video, a video feed-in interface for receiving a video from a video content provider, and/or a computer graphics system for generating computer graphics data as a source video, or a combination thereof. In a feasible implementation, if the video source 18 is a video camera, the source apparatus 12 and the destination apparatus 14 can constitute a so-called camera phone or a so-called video phone. The techniques described in this application may be, for example, applied to video decoding, and may be applied to wireless and/or wired applications.

The video encoder 20 may encode a video that is captured, pre-captured, or calculated by a computer. The encoded video data may be directly transmitted to the destination apparatus 14 through the output interface 22 of the source apparatus 12. The encoded video data may also (or alternatively) be stored in the storage apparatus 24 for subsequent access by the destination apparatus 14 or another apparatus for decoding and/or playing.

The destination apparatus 14 includes the input interface 28, a video decoder 30, and a display apparatus 32. In some applications, the input interface 28 may include a receiver and/or a modem. The input interface 28 of the destination apparatus 14 receives the encoded video data via the link 16. The encoded video data transmitted or provided to the storage apparatus 24 via the link 16 may include a plurality of syntactic elements generated by the video encoder 20 for a video decoder of the video decoder 30 to decode the video data. These syntactic elements may be included in the encoded video data transmitted on the communication medium, stored in the storage medium or stored in the file server.

The display apparatus 32 may be integrated with the destination apparatus 14 or disposed outside the destination apparatus 14. In some possible implementations, the destination apparatus 14 may include an integrated display apparatus and also be configured to connect to an interface of an external display apparatus. In other feasible implementations, the destination apparatus 14 may be a display apparatus. Generally, the display apparatus 32 displays decoded video data to a user, and may include any of a plurality of display apparatuses, for example, a liquid crystal display (LCD), a plasma display, an organic light-emitting diode (OLED) display, or another type of display apparatus.

The video encoder 20 and the video decoder 30 may operate according to, for example, a next-generation video coding compression standard (H.266) currently in development, and may comply with the H.266 test model (JEM). Alternatively, the video encoder 20 and the video decoder 30 may operate according to, for example, other dedicated or industrial standards or their extensions of the ITU-T H.265 standard or the ITU-T H.264 standard, where the ITU-T H.265 standard is also referred to as the HEVC standard, and the ITU-T H.264 standard is alternatively referred to as MPEG-4 Part 10 (AVC). However, the techniques of this application are not limited to any particular coding standard. Other feasible implementations of the video compression standard include MPEG-2 and ITU-T H.263.

Although not shown in FIG. 1, in some aspects, the video encoder 20 and the video decoder 30 may be integrated with an audio encoder and an audio decoder, respectively, and may include an appropriate multiplexer-demultiplexer (MUX-DEMUX) unit or other hardware and software to process code of both audio and video in a common data stream or a separate data stream. If applicable, in some feasible implementations, the MUX-DEMUX unit may comply with the ITU H.223 multiplexer protocol or other protocols such as the user datagram protocol (UDP).

The video encoder 20 and the video decoder 30 each may be implemented in any of a plurality of appropriate coder circuitry, for example, one or more microprocessors, digital signal processors (DSP), application-specific integrated circuits (ASIC), field-programmable gate arrays (FPGA), discrete logic, software, hardware, firmware, or any combination thereof. When the techniques are implemented partially in software, an apparatus may store instructions for the software in an appropriate non-transitory computer readable medium, and execute the instructions in a form of hardware using one or more processors, to implement the techniques of this application. Either of the video encoder 20 and the video decoder 30 may be included in one or more encoders or decoders. Either of the video encoder 20 and the video decoder 30 may be integrated as a part of a combined encoder/decoder (CODEC) in a corresponding apparatus.

This application may, for example, involve "signaling", by the video encoder 20, specific information to another apparatus such as the video decoder 30. However, it should be understood that the video encoder 20 may associate a specific syntactic element with encoded parts of video data, to signal information. In other words, the video encoder 20 may store the specific syntactic element in header information of the encoded parts of the video data, to "signal" data. In some applications, the syntactic element may be encoded and stored (for example, stored in a storage system 34 or a file server 36) before being received and decoded by the video decoder 30. Therefore, the term "signal" may mean, for example, transmission of syntactic data or other data used for decoding compressed video data, regardless of whether the transmission is in real time, nearly in real time, or within a time period. For example, the transmission may be performed when the syntactic element is stored in a medium during decoding, and then the syntactic element may be retrieved by a decoding apparatus at any time after being stored in the medium.

JCT-VC developed the HEVC standard. HEVC standardization is based on an evolved model of a video decoding apparatus called an HEVC test model (HM). The latest HEVC standard documentation is available at http://www.i-tu.int/rec/T-REC-H.265. The latest version of the standard documentation is H.265 (12/16), which is incorporated herein by reference in its entirety. The HM assumes that the video decoding apparatus has several additional capabilities with respect to existing algorithms of the ITU-TH.264/AVC. For example, H.264 provides nine intra-frame prediction coding modes, whereas the HM can provide up to 35 intra-frame prediction coding modes.

JVET is committed to developing the H.266 standard. An H.266 standardization process is based on an evolved model of a video decoding apparatus called an H.266 test model (JEM). H.266 algorithm descriptions are available at http://phenix.int-evry.fr/jvet, and the latest algorithm descriptions are included in JVET-F1001-v2. This algorithm description document is incorporated herein by reference in its entirety. In addition, reference software for the JEM test model is available at https://jvet.hhi.fraunhofer.de/svn/svn_HMJEM-Software/, which is also incorporated herein by reference in its entirety.

In general, an operation model description of the HM may partition a video frame or picture into a sequence of tree blocks or largest coding units (LCU) including both luminance and chrominance samples. A tree block has purposes similar to a macroblock in the H.264 standard. A slice includes several consecutive tree blocks in decoding order. A video frame or picture may be partitioned into one or more slices. Each tree block can be split into coding units (CU) according to a quadtree. For example, a tree block acting as a root node of the quadtree may be split into four child nodes, and each child node may act as a parent node and be split into four other child nodes. A final non-splittable child node acting as a leaf node of the quadtree includes a coding node, for example, a decoded video block. Syntactic data associated with a decoded bitstream may define a maximum quantity of splittable times of a tree block, and may also define a minimum size of a coding node.

A coding unit includes a coding node, a prediction unit (PU), and a transform unit (TU) associated with the coding node. A CU size corresponds to a coding node size, and needs to be in a square shape. The CU size may range from 8×8 pixels up to a size of the largest 64×64 pixels or a larger tree block size. Each CU may include one or more PUs and one or more TUs. For example, syntactic data associated with the CU may describe partitioning of one CU into one or more PUs. Partitioning patterns may vary when the CU is encoded in a skip or direct mode, encoded in an intra-frame prediction mode, or encoded in an inter-frame prediction mode. A PU may be partitioned into a non-square shape. For example, the syntactic data associated with the CU may also describe partitioning of one CU into one or more TUs according to the quadtree. A TU may be in a square or non-square shape.

The HEVC standard allows TU-based transformation, and TUs may be different for different CUs. A TU size is usually set based on a size of a PU within a given CU defined for a partitioned LCU. However, a case may not always be like this. The TU size is usually the same as or less than a PU size. In some feasible implementations, a quadtree structure called a "residual quadtree" (RQT) may be used to divide a residual sample corresponding to the CU into smaller units. A leaf node of the RQT may be referred to as a TU. Pixel differences associated with the TU may be transformed to generate transform coefficients, and the transform coefficients may be quantized.

Generally, a PU includes data related to a prediction process. For example, when the PU is encoded in an intra-frame mode, the PU may include data describing an intra-frame prediction mode of the PU. In another feasible implementation, when the PU is encoded in an inter-frame mode, the PU may include data defining a motion vector of the PU. For example, the data defining the motion vector of the PU may describe a horizontal component of the motion vector, a vertical component of the motion vector, a resolution of the motion vector (for example, quarter-pixel accuracy or one-eighth-pixel accuracy), a reference picture to which the motion vector is directed, and/or a reference picture list of the motion vector (for example, a list 0, a list 1, or a list C).

Generally, a TU uses transform and quantization processes. The given CU including one or more PUs may also include one or more TUs. After prediction, the video encoder 20 may calculate a residual value corresponding to the PU. The residual value includes a pixel difference, and the pixel difference may be transformed into a transform coefficient, and the transform coefficient is quantized, and subject to TU scanning to generate serialized transform coefficients for entropy decoding. In this application, the term "video block" is usually used to represent the coding node of the CU. In some specific applications, this application may also use the term "video block" to represent a tree block including the coding node, the PU, and the TU, for example, the LCU or the CU.

A video sequence generally includes a series of video frames or pictures. A group of pictures (GOP) includes, for example, a series of video images, or one or more video images. A GOP may include syntactic data in header information of the GOP, in header information of one or more of the pictures, or in another place, where the syntactic data describes a quantity of pictures included in the GOP. Each slice of a picture may include slice syntactic data describing a coding mode of the corresponding picture. The video encoder 20 usually performs an operation on video blocks in some video slices, to encode video data. A video block may correspond to a coding node in a CU. A size of the video block may be fixed or changeable, and may vary with a specified decoding standard.

In a feasible implementation, the HM supports prediction for a variety of PU sizes. It is assumed that a size of a particular CU is 2N×2N, and the HM supports intra-frame prediction of a PU size of 2N×2N or N×N, and inter-frame prediction of a symmetric PU size of 2N×2N, 2N×N, N×2N, or N×N. The HM also supports asymmetric partitioning of inter-frame prediction of PU sizes such as 2N×nU, 2N×nD, nL×2N, and nR×2N. In asymmetric partitioning, the CU is not partitioned in one direction, and is partitioned into 25% and 75% in the other direction. The CU portion corresponding to the 25% segment is indicated by an indicator including "n" followed by "U (Up)", "D (Down)", "L (Left)" or "R (Right)". Therefore, for example, "2N×nU" refers to 2N×2NCU of horizontal partitioning with 2N×0.5NPU at the top and 2N×1.5NPU at the bottom.

In this application, "N×N" and "N multiplied by N" may be used interchangeably to indicate a pixel size of a video block in a vertical dimension and a horizontal dimension, for example, 16×16 pixels or 16 multiplied by 16 pixels. In general, a 16×16 block has 16 pixels (y=16) in a vertical direction and 16 pixels (x=16) in a horizontal direction. Similarly, an N×N block has N pixels in the vertical direction and N pixels in the horizontal direction, where N represents a non-negative integer. Pixels in a block may be arranged in rows and columns. In addition, a block does not necessarily have a same quantity of pixels in the horizontal direction and in the vertical direction. For example, a block may include N×M pixels, where M is not necessarily equal to N.

After intra-frame predictive or inter-frame predictive decoding of PUs in the CU, the video encoder 20 may calculate residual data of TUs in the CU. A PU may include pixel data in a spatial domain (also referred to as a pixel domain), and a TU may include a coefficient in a transform domain after transform (for example, discrete cosine transform (DCT), integer transform, wavelet transform, or other conceptually similar transform) is applied to residual video data. The residual data may correspond to a pixel difference between pixels of a picture that is not encoded and a predictor corresponding to the PU. The video decoder 20 may generate a TU including residual data of the CU, and then transform the TU to generate CU transform coefficients.

After performing any transform to generate transform coefficients, the video encoder 20 may quantize the transform coefficients. Quantization means, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value, where n is greater than m.

The JEM model further improves a video image encoding structure. A block encoding structure called a "quadtree plus binary tree" (QTBT) is introduced. Without using such concepts as CU, PU, and TU in HEVC, the QTBT structure supports more flexible CU partitioning shapes. One CU may be in a square or rectangular shape. A coding tree unit (CTU) is first subject to quadtree partitioning, and further, binary tree partitioning is performed on leaf nodes of the quadtree. In addition, there are two binary tree partitioning modes, symmetric horizontal partitioning and symmetric vertical partitioning. A leaf node of the binary tree is referred to as a CU. A CU in the JEM cannot be further partitioned during prediction and transform. In other words, a CU, a PU, and a TU in the JEM have the same block size. In the current JEM, a maximum size of a CTU is 256×256 luminance pixels.

In some feasible implementations, the video encoder 20 may scan the quantized transform coefficient in a predefined scanning order to generate a serialized vector that can be entropy encoded. In some other feasible implementations, the video encoder 20 may perform adaptive scanning. After scanning the quantized transform coefficient to form a one-dimensional vector, the video encoder 20 may entropy decode the one-dimensional vector through context-adaptive variable-length decoding (CAVLC), context-adaptive binary arithmetic decoding (CABAC), syntax-based context-adaptive binary arithmetic decoding (SBAC), probability interval partitioning entropy (PIPE) decoding, or another entropy decoding method. The video encoder 20 may further entropy decode the syntactic element associated with the encoded video data for the video decoder 30 to decode the video data.

To perform CABAC, the video encoder 20 may assign a context in a context model to a to-be-transmitted symbol. The context may be related to whether an adjacent value of the symbol is non-zero. To perform CAVLC, the video encoder 20 may select a variable-length code of the to-be-transmitted symbol. A codeword in a variable-length code (VLC) may be constructed so that a shorter code corresponds to a more probable symbol, and a longer code corresponds to a less probable symbol. In this way, using VLC can reduce a bit rate as compared to using codewords of an equal length for each to-be-transmitted symbol. Probability in CABAC can be determined based on the context assigned to the symbol.

In some feasible implementations, the video encoder 20 and/or the video decoder 30 may identify a so-called "most probable" intra-frame prediction mode during intra-frame predictive decoding. In other words, for example, the video encoder 20 and/or the video decoder 30 may identify intra-frame prediction modes of previously decoded blocks (referred to as "reference blocks") adjacent to a currently decoded block, and compare these intra-frame prediction modes with an intra-frame prediction mode of the currently decoded block (referred to as a "current block"). Due to spatial proximity of the neighboring blocks and the current block, a probability that the intra-frame modes of these reference blocks are the same as or similar to that of the current block can be relatively high. As described in more detail below, intra-frame prediction modes of a plurality of reference blocks may be considered during identification of an MPM.

In addition, in some feasible implementations, the video encoder 20 and/or the video decoder 30 may signal an index for identifying an MPM. To be specific, as defined according to a decoding standard, each intra-frame mode may have an associated intra-frame mode index (an index pre-assigned to each mode by the standard, and an index temporarily assigned in a non-encoding and decoding process), and the intra-frame mode index is used to identify the intra-frame mode as one of a plurality of possible intra-frame modes. For example, the HEVC standard may support up to 35 intra-frame modes, where an index value (for example, an index value of a lookup table) is assigned to each intra-frame mode, and the index value may be used to identify an intra-frame mode.

In some feasible implementations, the video encoder 20 determines an intra-frame mode of a current block used for predicting video data, determines MPMs of the current block used for predicting the video data, compares the intra-frame mode with each of the MPMs in a comparison order, determines an index of each of the MPMs based on the comparison order, and signals an index of an MPM that matches the intra-frame mode of the current block used for predicting data in a bitstream.

In addition, in a feasible implementation, the video encoder 20 may signal a generated list of MPMs in the comparison order. The video encoder 20 may also determine an index of each of the MPMs, including assigning an index value to each of the MPMs in the list in ascending order. In another feasible implementation, the video encoder 20 may signal an MPM flag before signaling an index of the MPM, to indicate that the index of the MPM is to be signaled.

The MPM may be associated with a left neighboring video block of the current block and an upper neighboring video block of the current block, and the comparison order may include comparing the intra-frame mode of the current block with an intra-frame mode associated with the left neighboring video block before comparing the intra-frame mode of the current block with an intra-frame mode associated with the upper neighboring block. The MPM may be associated with a left neighboring video block of the current block and an upper neighboring video block of the current block, and the comparison order may include comparing the intra-frame mode of the current block with an intra-frame mode associated with the upper neighboring video block before comparing the intra-frame mode of the current block with an intra-frame mode associated with the left neighboring block.

In another feasible implementation, the video decoder 30 may generate a list of MPMs of a current block of video data. The MPMs in the list may then be ordered in a comparison order. The comparison order may indicate an order of comparing an intra-frame mode of the current block of the video data with one or more intra-frame modes associated with one or more reference blocks of the video data during encoding of the current block of the video data. The video decoder 30 may determine an MPM index used to identify the intra-frame mode of the current block in the list of the MPMs. The video decoder 30 may then identify the intra-frame modes of the current block using the MPM indexes and decode the current block in the identified intra-frame mode of the current block.

In a feasible implementation, more than two reference blocks include one or more blocks that are located above the current block and adjacent to the current block. The more than two reference blocks may include one or more blocks that are located on the left of the current block and adjacent to the current block. In a feasible implementation, the MPMs in the list are arranged in the comparison order. The comparison order indicates an order of comparing the intra-frame mode of the current block of the video data with one or more intra-frame modes associated with one or more reference blocks of the video data during encoding of the current block of the video data.

In another feasible implementation, the MPM may be associated with a left neighboring video block of the current block and an upper neighboring video block of the current block, and the comparison order may include comparing the intra-frame mode of the current block with an intra-frame mode associated with the left neighboring block before comparing the intra-frame mode of the current block with an intra-frame mode associated with the upper neighboring block. In another feasible implementation, the MPM may be associated with a left neighboring video block of the current block and an upper neighboring video block of the current block, and the comparison order may include comparing the intra-frame mode of the current block with an intra-frame mode associated with the upper neighboring block before comparing the intra-frame mode of the current block with an intra-frame mode associated with the left neighboring video block.

A particular aspect of this application relates to assigning a default mode in an example in which intra-frame mode decoding is not applicable to a block A or a block B. For example, the video encoder 20 or a video decoder such as the video decoder 30 may identify the current block of the video data. The decoder may determine whether a block can be used as a reference block for determining an MPM of the current block of the video data. The video decoder may assign a default intra-frame mode to any block that cannot be used as a reference block. In some feasible implementations, the default intra-frame mode may be a planar mode, a DC mode, or the like. The decoder may determine an intra-frame mode of the current block of the video data based on an intra-frame mode of one or more blocks of the video data. In addition, the decoder may decode the current block in the determined intra-frame mode.

Figure 2:
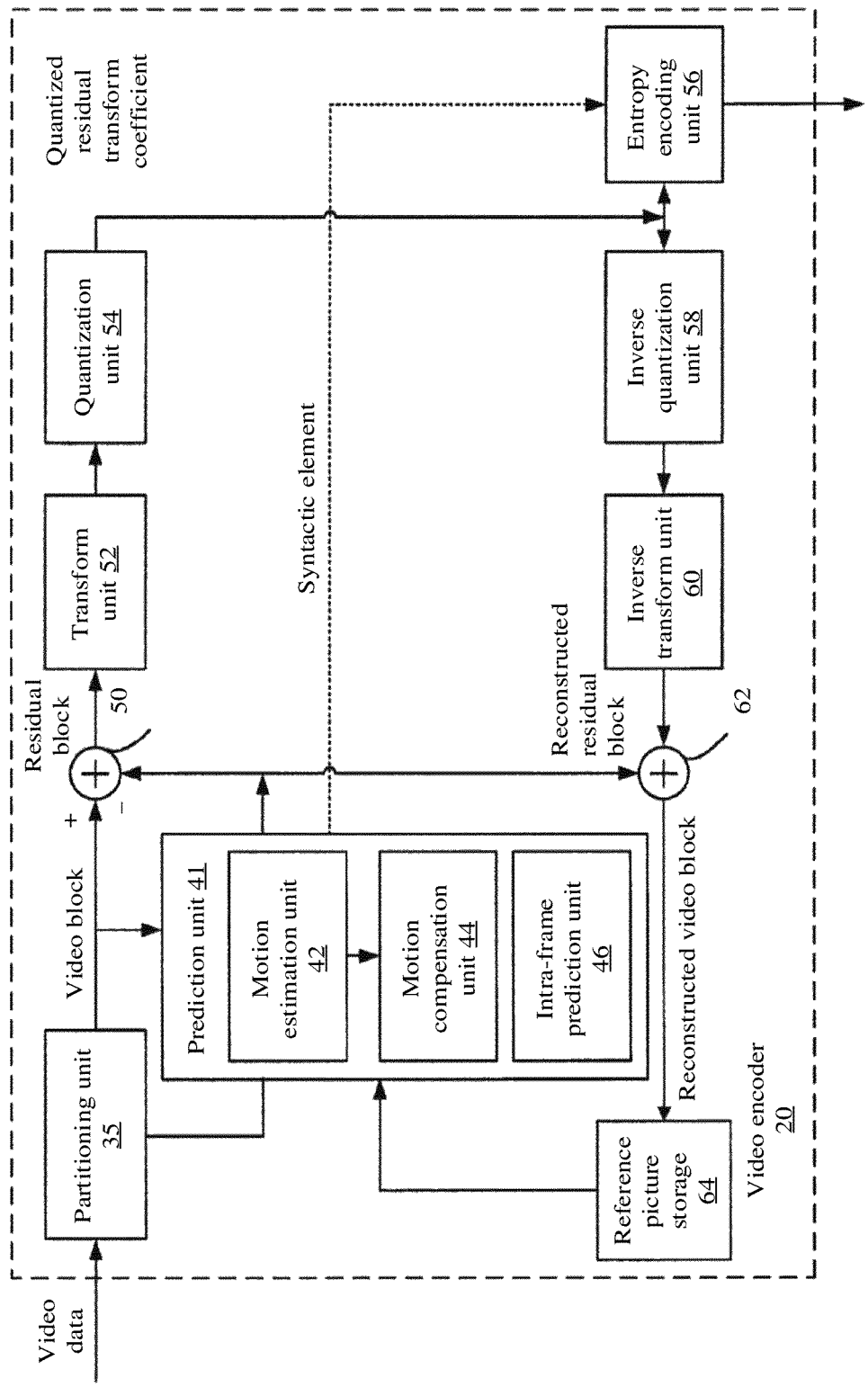
FIG. 2 is a block diagram of a video encoder in a feasible implementation of a technology described in an embodiment of this application.

FIG. 2 is a block diagram of a video encoder 20 in a feasible implementation of a technology described in an embodiment of this application. The video encoder 20 may perform intra-frame decoding and inter-frame decoding for a video block in a video slice. Intra-frame decoding relies on spatial prediction to reduce or remove spatial redundancy of a video in a given video frame or picture. Inter-frame decoding relies on time prediction to reduce or remove time redundancy of a video in an adjacent frame or picture of a video sequence. An intra-frame mode (I mode) may be any one of several space-based compression modes. An inter-frame mode, such as unidirectional prediction (P mode) or bidirectional prediction (B mode), may be any one of several time-based compression modes.

In a feasible implementation of FIG. 2, the video encoder 20 includes a partitioning unit 35, a prediction unit 41, a reference picture storage 64, a summator 50, a transform processing unit 52, a quantization unit 54, and an entropy encoding unit 56. The prediction unit 41 includes a motion estimation unit 42, a motion compensation unit 44, and an intra-frame prediction module 46. For video block reconstruction, the video encoder 20 further includes an inverse quantization unit 58, an inverse transform unit 60, and a summator 62. A de-blocking filter (not shown in FIG. 2) may be further included to perform filtering on a boundary of a block, so as to remove block artifact from a reconstructed video. When needed, the de-blocking filter usually performs filtering on output of the summator 62. In addition to the de-blocking filter, an additional loop filter (in-loop filter or outer-loop filter) may also be used.

As shown in FIG. 2, the video encoder 20 receives video data, and the partitioning unit 35 partitions the data into video blocks. Such partitioning may further include partitioning into slices, image blocks, or other larger units, and for example, video block partitioning according to quadtree structures of LCUs and CUs. For example, for the video encoder 20, components for encoding video blocks in a to-be-encoded video slice are described. Generally, one slice may be partitioned into a plurality of video blocks (and may be partitioned into sets of video blocks called image blocks).

The prediction unit 41 may select one of a plurality of possible decoding modes of a current video block, for example, one of a plurality of intra-frame decoding modes or one of a plurality of inter-frame decoding modes, based on a calculation result of coding quality and costs (for example, a rate-distortion cost, RD cost). The prediction unit 41 may provide an intra-frame decoded or inter-frame decoded block to the summator 50 to generate residual block data, and provide the intra-frame decoded or inter-frame decoded block to the summator 62 to reconstruct an encoded block and use the reconstructed block as a reference picture.

The motion estimation unit 42 and the motion compensation unit 44 in the prediction unit 41 perform inter predictive decoding for the current video block relative to one or more predictive blocks in one or more reference pictures, to provide time compression. The motion estimation unit 42 may be configured to determine an inter-frame prediction mode for a video slice based on a preset mode of a video sequence. In the preset mode, a video slice in the sequence may be specified as a P slice, a B slice, or a GPB slice. The motion estimation unit 42 and the motion compensation unit 44 may be highly integrated, but are described separately for concept explanation purposes. Motion estimation performed by the motion estimation unit 42 is a process of generating a motion vector for estimating a video block. For example, the motion vector may indicate a displacement of a PU of a video block in a current video frame or picture relative to a predictive block in a reference picture.

A predictive block is a block in a PU that is found, based on a pixel difference, to be closely matched with a to-be-decoded video block, where the pixel difference may be determined based on a sum of absolute differences (SAD), a sum of squared differences (SSD), or other difference metrics. In some feasible implementations, the video encoder 20 may calculate a value of a sub-integer pixel position of a reference picture stored in the reference picture storage 64. For example, the video encoder 20 may interpolate a value of one-fourth pixel position, one-eighth pixel position, or other fraction pixel positions of the reference picture. Therefore, the motion estimation unit 42 may perform a motion search with respect to a full pixel position and a fraction pixel position, and output a motion vector with a fraction pixel precision.

The motion estimation unit 42 calculates a motion vector of a PU of a video block in an inter-frame decoded slice by comparing a position of the PU and a position of the predictive block of the reference picture. The reference picture may be selected from a first reference picture list (a list 0) or a second reference picture list (a list 1). Each list identifies one or more reference pictures stored in the reference picture storage 64. The motion estimation unit 42 sends the calculated motion vector to the entropy encoding unit 56 and the motion compensation unit 44.

Motion compensation implemented by the motion compensation unit 44 may involve abstracting or generating a predictive block based on the motion vector determined through motion estimation, and interpolation to a fraction pixel precision may be performed. After receiving the motion vector of the PU of the current video block, the motion compensation unit 44 may locate a predictive block directed by the motion vector in one of the reference picture lists. The video encoder 20 subtracts a pixel value of the predictive block from a pixel value of the current video block being decoded, to obtain a residual video block, and obtain a pixel difference. The pixel difference forms residual data of a block, and may include a luminance difference component and a chrominance difference component. The summator 50 is one or more components performing the subtraction operation. The motion compensation unit 44 may further generate a syntactic element associated with the video block and the video slice for a video decoder 30 to decode the video block in the video slice.

An intra-frame prediction unit 46 in the prediction unit 41 may perform intra predictive decoding for a current video block relative to one or more neighboring blocks in the same picture or slice as the current to-be-decoded block, to provide spatial compression. Therefore, as an alternative of inter-frame prediction (as described earlier) performed by the motion estimation unit 42 and the motion compensation unit 44, the intra-frame prediction unit 46 may perform intra-frame prediction for the current block. To put it clearly, the intra-frame prediction unit 46 may determine an intra-frame prediction mode for encoding the current block. In some feasible implementations, the intra-frame prediction unit 46 may, for example, use various intra-frame prediction modes to encode the current block during coding traversal, and the intra-frame prediction unit 46 (or in some feasible implementations, a mode selection unit 40) may select, from tested modes, an appropriate intra-frame prediction mode for use.

For example, the intra-frame prediction unit 46 may calculate a rate-distortion value through a rate-distortion analysis for various tested intra-frame prediction modes and select an intra-frame prediction mode having a best rate-distortion characteristic among the tested modes. In an example, the rate-distortion analysis is used to determine an amount of distortion (or error) between an encoded block and an original uncoded block that is to be encoded to generate the encoded block, and a code rate (for example, a quantity of bits) used to generate the encoded block. The intra-frame prediction unit 46 may calculate distortion and bit rates of various encoded blocks to determine which intra-frame prediction mode has best rate-distortion of the block. According to the HEVC standard, there may be up to 35 intra-frame prediction modes, and each intra-frame prediction mode may be associated with an index.

The aspects of this application relate to, for example, intra-frame decoding. Therefore, a particular technology of this application may be performed by the intra-frame prediction unit 46. In other words, for example, the intra-prediction unit 46 may perform the techniques of this application described below with respect to FIG. 4 to FIG. 10. In other feasible implementations, one or more other units of the video encoder 20 may additionally or alternatively be responsible for executing the techniques of this application.

For example, the intra-frame prediction unit 46 may determine an intra-frame mode of a currently encoded block (for example, according to the rate-distortion analysis as described above). The intra-frame prediction unit 46 may also determine an intra-frame prediction mode (referred to as an MPM) of one or more previously decoded blocks adjacent to the currently decoded block. The intra-prediction unit 46 may, for example, compare the MPM with the intra-frame mode of the current block, to indicate the determined intra-frame mode of the current block based on the determined intra-frame mode of the neighboring block, as described in more detail below.

According to this application, the intra-frame prediction unit 46 may generate a list of MPMs according to an order of comparing MPMs with the intra-frame mode of the current block. The intra-frame prediction unit 46 may then assign index values to the MPMs in the order of comparing the MPMs with the intra-frame modes of the current block. In this manner, the intra-frame prediction unit 46 may indicate a specific MPM when the MPMs are not sorted according to intra-frame mode index values (an index pre-assigned to each mode by a standard, and an index temporarily assigned in a non-encoding and decoding process) of the MPMs.

After the prediction unit 41 generates a predictive block of the current video block through inter-frame prediction or intra-frame prediction, the video encoder 20 subtracts the predictive block from the current video block, to obtain a residual video block. Residual video data in the residual block may be included in one or more TUs, and is applied to the transform processing unit 52. The transform processing unit 52 applies transform, for example, DCT or other conceptually similar transform (for example, discrete sine transform DST) to transform the residual video data into a residual transform coefficient. The transform processing unit 52 may convert the residual video data from a pixel domain to a transform domain (for example, a frequency domain).

The transform processing unit 52 may send the obtained transform coefficient to the quantization unit 54. The quantization unit 54 quantizes the transform coefficient to further reduce a bit rate. The quantization process can reduce a bit depth associated with some or all of the coefficients. A quantization degree may be modified by adjusting a quantization parameter. In some feasible implementations, the quantization unit 54 may then perform scanning for a matrix including the quantized transform coefficient. Alternatively, the entropy encoding unit 56 may perform the scanning.

After quantization, the entropy encoding unit 56 may entropy encode the quantized transform coefficient. For example, the entropy encoding unit 56 may perform context-adaptive variable-length decoding, context-adaptive binary arithmetic decoding, syntax-based context-adaptive binary arithmetic decoding, probability interval partitioning entropy decoding, or another entropy encoding method or technique. The entropy encoding unit 56 may also entropy encode a motion vector and another syntactic element of a currently decoded video slice. After being entropy encoded by the entropy encoding unit 56, an encoded bitstream may be transmitted to the video decoder 30 or recorded for subsequent transmission or retrieved by the video decoder 30.

The entropy encoding unit 56 may encode information indicating, according to the technique in this application, the selected intra-frame prediction mode. The video encoder 20 may include, in transmitted bitstream configuration data that may include a plurality of intra-frame prediction mode index tables and a plurality of modified intra-frame prediction mode index tables (also referred to as codeword mapping tables), definitions of encoding contexts of various blocks, and indications of an MPM, an intra-frame prediction mode index table, and a modified intra-frame prediction mode index table for each of the contexts.

The inverse quantization unit 58 and the inverse transform unit 60 respectively apply inverse quantization and inverse transform, to reconstruct a residual block in the pixel domain to be subsequently used as a reference block of a reference picture. The motion compensation unit 44 may calculate the reference block by summating the residual block and a predictive block of one of the reference pictures in one of the reference picture lists. The motion compensation unit 44 may also apply one or more interpolation filters to the reconstructed residual block, to calculate the sub-integer pixel value for motion estimation. The summator 62 adds the reconstructed residual block and the motion compensated predictive block generated by the motion compensation unit 44 to generate a reference block, where the reference block is stored in the reference picture storage 64. The reference block may be used by the motion estimation unit 42 and the motion compensation unit 44 as a reference block for performing inter-frame prediction for a block in a subsequent video frame or picture.

Figure 3:
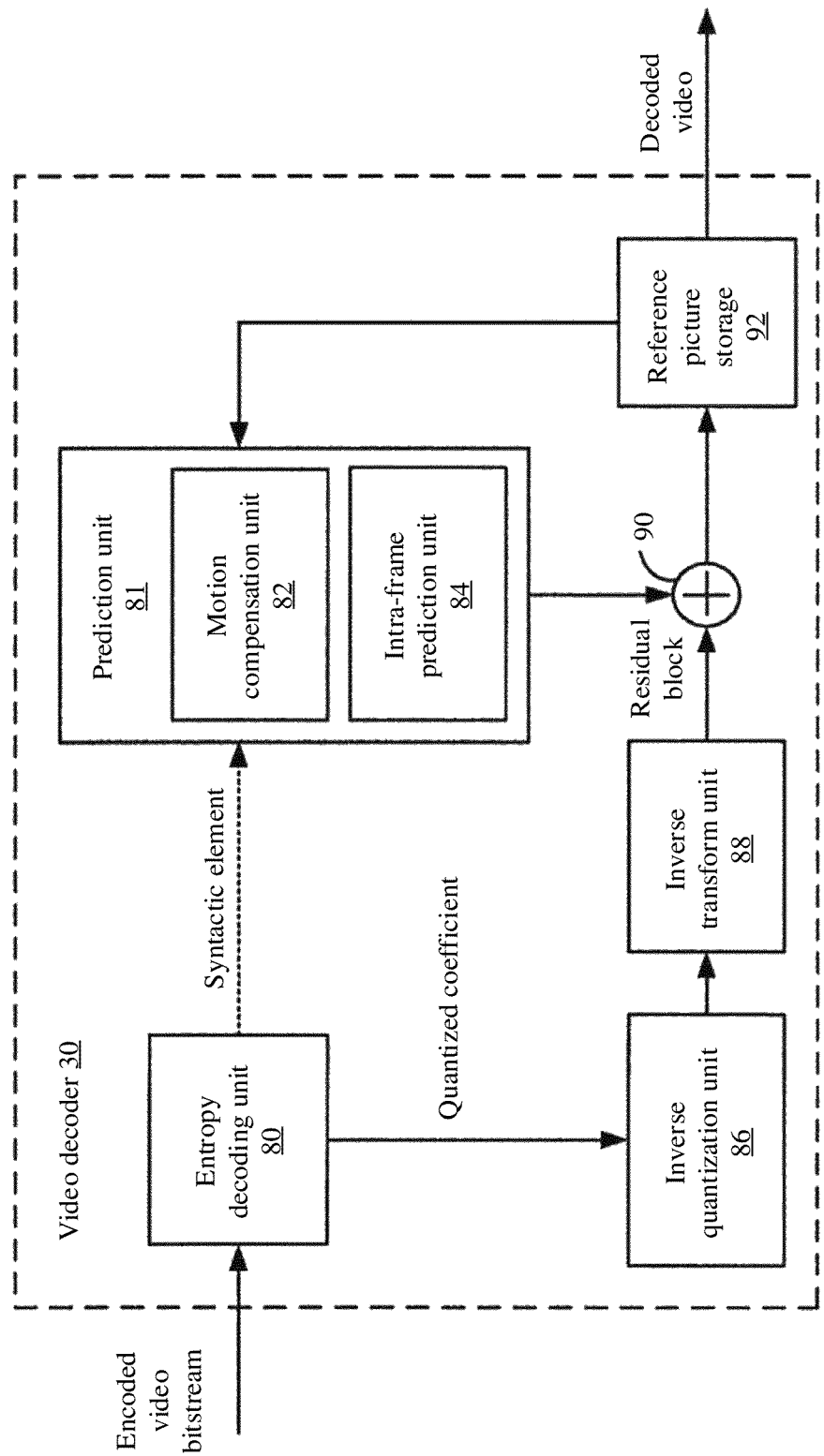
FIG. 3 is a block diagram of a video decoder in a feasible implementation of a technology described in an embodiment of this application.

FIG. 3 is a block diagram of a video decoder 30 in a feasible implementation of a technology described in an embodiment of this application. In a feasible implementation of FIG. 3, the video decoder 30 includes an entropy decoding unit 80, a prediction unit 81, an inverse quantization unit 86, an inverse transform unit 88, a summator 90, and a reference picture storage 92. The prediction unit 81 includes a motion compensation unit 82 and an intra-frame prediction unit 84. In some feasible implementations, the video decoder 30 may perform a decoding process inverse to the encoding process of the video encoder 20 described in FIG. 4.

During decoding, the video decoder 30 receives, from the video encoder 20, an encoded video bitstream representing a video block of an encoded video slice and an associated syntactic element. The entropy decoding unit 80 of the video decoder 30 entropy decodes the bitstream, to generate a quantized coefficient, a motion vector, and other syntactic elements. The entropy decoding unit 80 sends the motion vector and other syntactic elements to the prediction unit 81.

The video decoder 30 may receive the syntactic elements at a video slice level and/or a video block level.

When a video slice is decoded as an intra-frame decoded (I) slice, the intra-frame prediction unit 84 of the prediction unit 81 may generate prediction data of a video block in the current video slice based on a signaled intra-frame prediction mode and data of the previously decoded block of a current frame or picture.

As described above, the aspects of this application relate to, for example, intra-frame decoding. Therefore, a particular technology of this application may be performed by the intra-frame prediction unit 84. In other words, for example, the intra-prediction unit 84 may perform the techniques of this application described below with respect to FIG. 4 to FIG. 7. In other feasible implementations, one or more other units of the video decoder 30 may additionally or alternatively be responsible for executing the techniques of this application.

For example, the intra-frame prediction unit 84 may obtain, from the entropy decoding unit 80, indexes of a list of MPMs for decoding a current block of video data. The intra-frame prediction unit 84 may make MPMs be included in the list in the same way as the video encoder 20 (for example, in an order of comparing the MPMs with an intra-frame mode of the current block) to produce a list to which the indexes belong. The intra-frame prediction unit 84 may then determine an appropriate intra-frame mode of the current block that is used to decode the video data based on the obtained indexes. In this manner, the intra-frame prediction unit 84 may determine an appropriate MPM used for decoding the current block when the MPMs are not sorted according to intra-frame mode index values (an index pre-assigned to each mode by a standard, and an index temporarily assigned in a non-encoding and decoding process) of the MPMs.

When a video image is decoded as an inter-frame decoded slice (for example, a B slice, a P slice, or a GPB slice), the motion compensation unit 82 of the prediction unit 81 generates a predictive block of a video block of the current video image based on the motion vector and other syntactic elements that are received from the entropy encoding unit 80. The predictive block may be generated from one of reference pictures in one of reference picture lists. The video decoder 30 may use a default construction technique to construct reference picture lists (a list 0 and a list 1) based on a reference picture stored in the reference picture storage 92.

The motion compensation unit 82 determines prediction information of a video block of the current video slice by parsing the motion vector and other syntax elements, and uses the prediction information to generate the predictive block of the currently decoded video block. For example, the motion compensation unit 82 uses some of the received syntactic elements to determine a prediction mode (for example, intra-frame prediction or inter-frame prediction) for decoding the video blocks of the video slice, an inter-frame prediction slice type (for example, a B slice, a P slice, or a GPB slice), construction information of one or more of the reference picture lists for the slice, a motion vector for each inter encoded video block of the slice, an inter-frame prediction status for each inter-frame decoded video block of the slice, and other information for decoding the video blocks in the current video slice.

The motion compensation unit 82 may further perform interpolation using an interpolation filter. The motion compensation unit 82 may use an interpolation filter used by the video encoder 20 during video block encoding, to calculate an interpolation value of a sub-integer pixel of a reference block. In this case, the motion compensation unit 82 may determine, based on the received syntactic elements, the interpolation filter used by the video encoder 20, and use the interpolation filter to generate the predictive block.

The inverse quantization unit 86 performs inverse quantization (for example, dequantization) on a quantized transform coefficient that is provided in the bitstream and decoded by the entropy encoding unit 80. The inverse quantization process may include determining a quantization degree based on a quantization parameter calculated by the video encoder 20 for each video block in the video slice, and determining an inverse quantization degree to be applied. The inverse transform unit 88 applies inverse transform (for example, inverse DCT, inverse integer transform, or a conceptually similar inverse transform process) to the transform coefficient to generate a residual block in a pixel domain.

After the motion compensation unit 82 generates the predictive block of the current video block based on the motion vector and other syntactic elements, the video decoder 30 summates the residual block from the inverse transform unit 88 and the corresponding predictive block generated by the motion compensation unit 82, to generate a decoded video block. The summator 90 is one or more components performing the summation operation. When needed, a de-blocking filter may be used to filter the decoded block to remove block artifact. Another loop filter (in-loop decoding filter or outer-loop decoding filter) may also be used to smooth pixel transform, or video quality is improved in another manner. Then, the decoded video block in a given frame or picture is stored in the reference picture storage 92. The reference picture storage 92 stores a reference picture used for subsequent motion compensation. The reference picture storage 92 also stores the decoded video to be later presented in a display apparatus such as the display apparatus 32 in FIG. 1.

As described above, the techniques of this application relate to, for example, intra-frame decoding. It should be understood that the techniques in this application may be implemented by any video decoder described in this application, and the video decoder includes, for example, the video encoder 20 and the video decoder 30 shown and described in FIG. 1 to FIG. 3. In other words, in a feasible implementation, the intra-frame prediction unit 46 described in FIG. 2 may perform, when performing intra-frame prediction during encoding of a block of video data, a particular technology described below. In another feasible implementation, the intra-frame prediction unit 84 described with reference to FIG. 3 may perform, when performing intra-frame prediction during encoding of a block of video data, a particular technology described below. Therefore, a reference to a general "video decoder" may include the video encoder 20, the video decoder 30, or another video coding unit.

In some feasible implementations, the video decoder may identify a so-called "most probable" intra-frame prediction mode during intra-frame predictive decoding. In other words, for example, a video encoder (for example, the video encoder 20) may identify intra-frame prediction modes of previously encoded blocks (for example, reference blocks) and compare the intra-frame prediction modes with the intra-frame prediction mode of the current block. Due to spatial proximity of the reference blocks and the current block, a probability that the intra-frame modes of these reference blocks are the same as or similar to that of the current block can be relatively high. As described in more detail below, intra-frame prediction modes of a plurality of reference blocks may be considered during identification of an MPM.

If the intra-frame prediction mode of the current block is the same as the MPM, the video encoder 20 may use a 1-bit MPM flag as a signal to send the intra-frame prediction mode. In other words, the video encoder 20 may signal that the intra-frame prediction mode of the current block is the same as the MPM, and does not need to explicitly identify the intra-frame prediction mode of the current block. The video decoder 30 may receive the flag indicating that the intra-frame mode of the current block is the same as the MPM, and use the same processing procedure as the video encoder 20 to determine the MPM.

Figure 4:
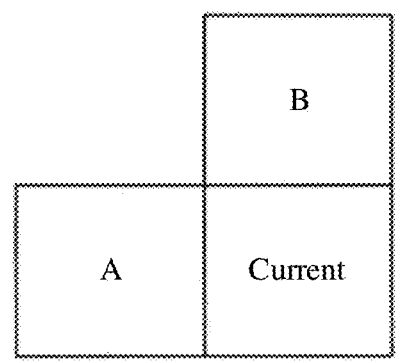
FIG. 4 is a block diagram of a video data block that may be considered during intra-frame mode prediction.

FIG. 4 shows a feasible implementation of a current block (for example, a coding unit) ("current CU") and two reference blocks (for example, "A" and "B") that may be considered during intra-frame decoding. For example, a video encoder (for example, the video encoder 20) may consider intra-frame modes associated with the reference block A (located on the left of the current block) and the reference block B (located above the current block) as MPMs of the current block. In some feasible implementations, if neither of the MPM candidates (for example, the block A or the block B) use an intra-frame mode, or are available in another manner (for example, the block has not been decoded), the video encoder 20 may then assign a default intra-frame mode, for example, a DC mode, to the block. Similarly, in some feasible implementations, a quantity of MPMs may be greater than two. For example, the video encoder 20 may generate additional MPMs based on intra-frame modes of more than two reference blocks.

If an actual intra-frame mode of the current block (for example, computed by the intra-frame prediction unit 46) is the same as that of the reference block A or the reference block B, the video encoder 20 may signal a 1-bit flag to indicate that the MPM is used to encode the current block (for example, set the MPM flag to "1").

In addition, in some feasible implementations, the video encoder 20 may signal an index for identifying an MPM. To be specific, each intra-frame mode may have an associated intra-frame mode index (an index pre-assigned to each mode by the standard, and an index temporarily assigned in a non-encoding and decoding process), and the intra-frame mode index is used to identify the intra-frame mode as one of a plurality of possible intra-frame modes as defined according to a decoding standard. For example, the 35 intra-frame modes supported in the HEVC standard, and an index value assigned to each intra-frame mode are shown in the following Table 1:

TABLE 1

Intra-frame prediction modes and index numbers

| Index numbers | Names associated with the intra-frame prediction modes |
|---|---|
| 0 | Intra_Planar (planar mode) |
| 1 | Intra_DC (direct current mode) |
| 2-34 | Intra_Angular (directional prediction mode) |

In a feasible implementation of Table 1, the planar mode has an original index value of 0, the DC mode has an original index value of 1, and various directional prediction modes have original index values between 2 and 34. The original index values refer to an index pre-assigned to each mode by a standard, and an index temporarily assigned in a non-encoding and decoding process.

In a feasible implementation, the video encoder 20 may compare the intra-frame mode associated with the current block of the video data with an intra-frame mode associated with one or more reference blocks, for example, an intra-frame mode of one or more neighboring blocks (for example, blocks adjacent to the current block in space), to determine one of the MPMs that matches the actual intra-frame mode of the current block. The video encoder 20 may compare the intra-frame mode of the current block with two neighboring blocks, but may consider intra-frame modes of more or fewer reference blocks (for example, one reference block, three reference blocks, five reference blocks, and the like). In addition, the MPMs may be generated based on neighboring intra-frame modes.

In a feasible implementation, the video encoder 20 may assign index values to the MPMs in an order of comparing the MPMs with the current intra-frame mode. In a feasible implementation with two MPMs, the video encoder 20 may first compare the intra-frame mode of the current block with an intra-frame mode of a left neighboring block, and then compare the intra-frame mode of the current block with an intra-frame mode of an upper neighboring block (for example, refer to the arrangement shown in FIG. 4). In this case, the video encoder 20 may assign an index value "0" to the intra-frame mode of the left neighboring block and assign an index value "1" to the intra-frame mode of the upper neighboring block. In a feasible implementation, when there are more than two MPMs, an additional index value may be assigned to another MPM. If the intra-frame mode of the current block does not match one of the MPMs, the video encoder 20 may set a flag of the MPM to zero. In addition, the video encoder 20 may use a fixed-length table or another method to decode remaining intra-frame modes.

In a feasible implementation, it is assumed that 35 intra-frame modes may be used for intra-frame decoding of blocks of the video data. It is further assumed that the 35 intra-frame modes may be identified using mode numbers, and the mode numbers may be included in a table for identifying available intra-frame modes. In a feasible implementation in which the current mode is not an MPM, it may be assumed that the MPMs are 15, 2, and 31, and the current mode is 16. The video decoder 30 or the video encoder 20 may initially sort the MPMs in ascending order. Therefore, a list of the MPMs 15, 2, and 31 is changed to a list of 2, 15, and 31 after sorting. Second, the video encoder/decoder may exclude the MPMs from the remaining intra-frame modes since it is known that the current mode is not an MPM. The remaining 32 modes may then be remapped to 32 5-bit codewords. In a feasible implementation, a table of the remaining 32 modes may be used, excluding the modes 2, 15, and 31. In another feasible implementation, the table may not be used.

With respect to the mapping, for example, because the current mode (for example, the mode 16) is greater than or equal to the first one (the mode 2) in sorted MPMs, the video decoder may subtract 1 from the current mode (16−1=15). The value (15) obtained after the first subtraction is also greater than or equal to the second one (15) in the sorted MPMs, and therefore the video decoder subtracts 1 again (15−1=14). Because the value (14) obtained after the second subtraction is smaller than 31, the video decoder does not perform another subtraction. Therefore, the current mode is mapped to the $14^{th}$ input item in the new table obtained through calculation by performing two subtractions (16−2=14) for the current mode 16. In another feasible implementation, the mode may be mapped differently.

In another feasible implementation in which the current mode is not an MPM, it may be assumed that the MPMs are 5, 4, and 6, and the current mode is 15. The video decoder may sort the MPMs in ascending order. Therefore, 5, 4, and 6 are changed to 4, 5, and 6. The video decoder may then generate a list or table of the remaining 32 modes excluding the modes 4, 5, and 6. As described above, it should be understood that the table is not used in all feasible implementations.

Figure 5:
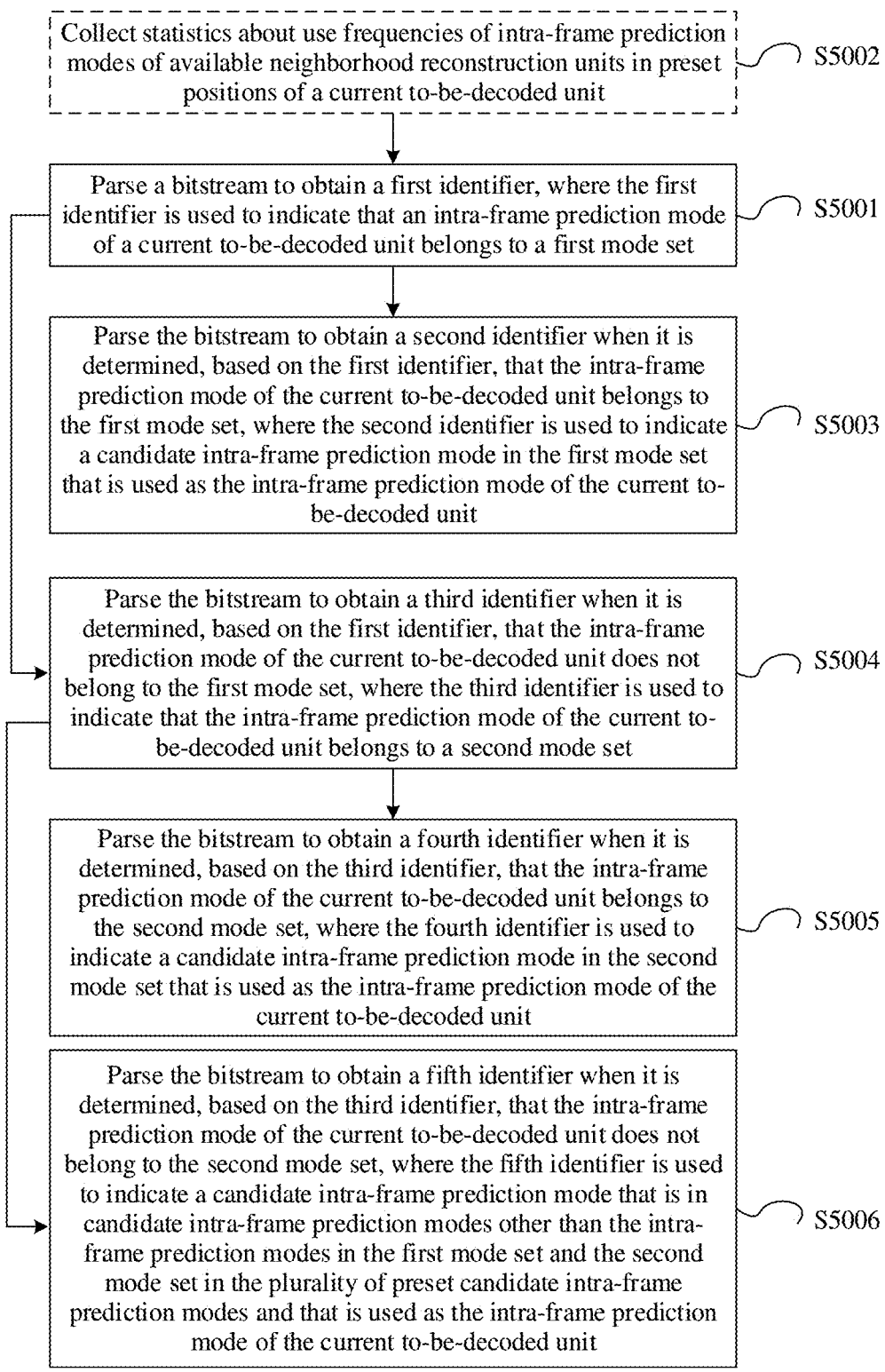
FIG. 5 is a flowchart of a video data decoding method in one or more feasible implementations described in an embodiment of this application.

FIG. 5 is a flowchart of a video data decoding method in one or more feasible implementations described in an embodiment of this application.

Figure 6:
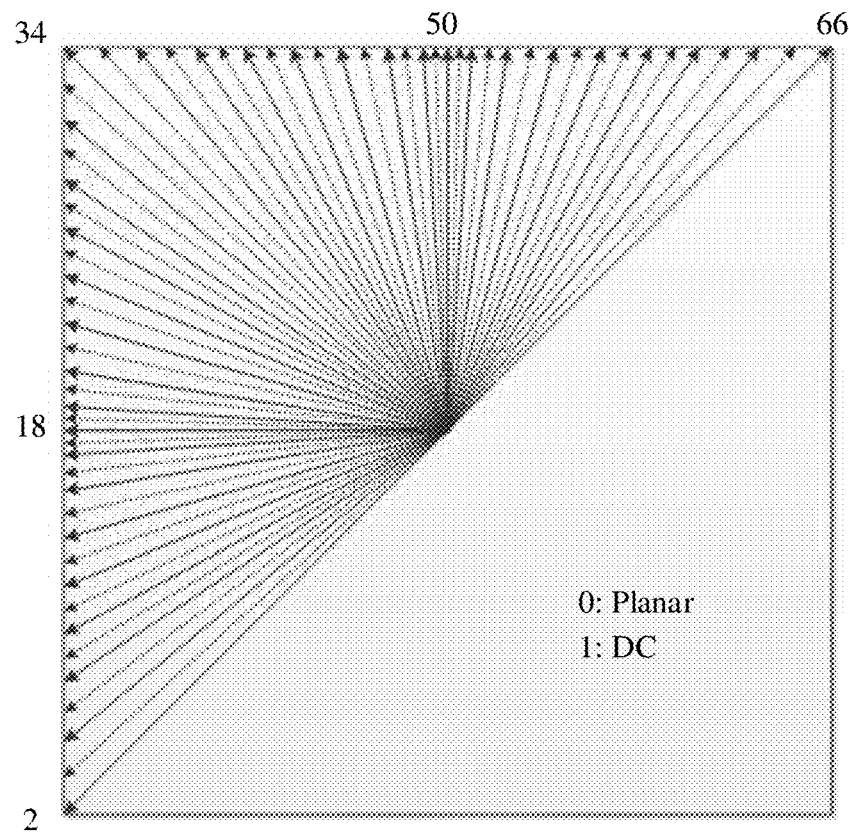
FIG. 6 is a schematic diagram of an example of an intra-frame prediction mode set according to an embodiment of this application.

For example, it may be assumed that there are 67 candidate intra-frame prediction modes, including 65 directional prediction modes and two non-directional prediction modes, a planar mode, and a DC mode. The planar mode and the DC mode are the same as corresponding prediction modes in H.265. Prediction directions and distribution represented by the 65 directional prediction modes are shown in FIG. 6. It can be seen that the directional prediction modes are prediction modes represented by a plurality of prediction directions that are distributed at equal angular intervals between two directions of 180 degrees on a two-dimensional plane. In addition, for example, it may be assumed that the foregoing 67 candidate intra-frame prediction modes may be divided into an MPM set, a set of selected modes, and a set of non-selected modes (which may also be referred to as remaining modes), to improve efficiency of finally selecting an intra-frame prediction mode for encoding. Further, it may be assumed that the MPM set includes six candidate intra-frame prediction modes, the set of selected modes includes 16 candidate intra-frame prediction modes, and the remaining 45 candidate intra-frame prediction modes are the remaining modes, or belong to the set of non-selected modes. It should be understood that, a quantity of the directional prediction modes, a quantity of the non-directional prediction modes, a quantity of prediction modes in the MPM set, a quantity of prediction modes in the set of selected modes, and a quantity of prediction modes in the set of non-selected modes are not limited.

It should be understood that a set of candidate intra-frame prediction modes in the MPM set is a subset of the 67 candidate intra-frame prediction modes.

It should be understood that the candidate intra-frame prediction modes in the MPM set are different from each other, and the candidate intra-frame prediction modes in the set of selected modes are different from each other.

As an example, the method in this embodiment of this application includes the following steps.

S5001: Parse a bitstream to obtain a first identifier, where the first identifier is used to indicate that an intra-frame prediction mode of a current to-be-decoded unit belongs to a first mode set.

It may be assumed that the first mode set is the MPM set, and correspondingly the first identifier is a flag identifying whether the intra-frame prediction mode of the current to-be-decoded unit finally selected by an encoder side is from the MPM set. For example, when the first identifier is "1", it indicates that the intra-frame prediction mode of the current to-be-decoded unit comes from the MPM set, or when the first identifier is "0", it indicates that the intra-frame prediction mode of the current to-be-decoded unit does not belong to the MPM set.

It should be understood that the MPM set may be constructed in a plurality of manners, including a type of a candidate intra-frame prediction mode in the MPM set and an arrangement sequence of the candidate intra-frame prediction modes in the set list.

In a first feasible implementation, the candidate intra-frame prediction modes in the MPM set include, (1) Intra-frame prediction modes of available neighborhood reconstruction units in preset positions of the current to-be-decoded unit, where the available neighborhood reconstruction units in preset positions of the current to-be-decoded unit include neighborhood reconstruction units, in preset positions, that belong to the same coding unit set as the current to-be-decoded unit and that obtain a predictor through intra-frame prediction, belonging to the same coding unit set means belonging to a same picture, a same slice, a same tile, and so on, that is, the neighborhood reconstruction units in the preset positions exist, and the neighborhood reconstruction units in the preset positions may include a reconstruction unit that is directly to the left of the current to-be-decoded unit and that is adjacent to a lower-left corner of the current to-be-decoded unit, a reconstruction unit that is directly above the current to-be-decoded unit and that is adjacent to an upper-right corner of the current to-be-decoded unit, a reconstruction unit in a lower-left adjacent position, a reconstruction unit in an upper-right adjacent position, and a reconstruction unit in an upper-left adjacent position, (2) Preset intra-frame prediction modes, including a preset non-directional prediction mode and a preset directional prediction mode, and (3) A directional prediction mode and a prediction mode in an adjacent prediction direction that are obtained based on (1).

Figure 7:
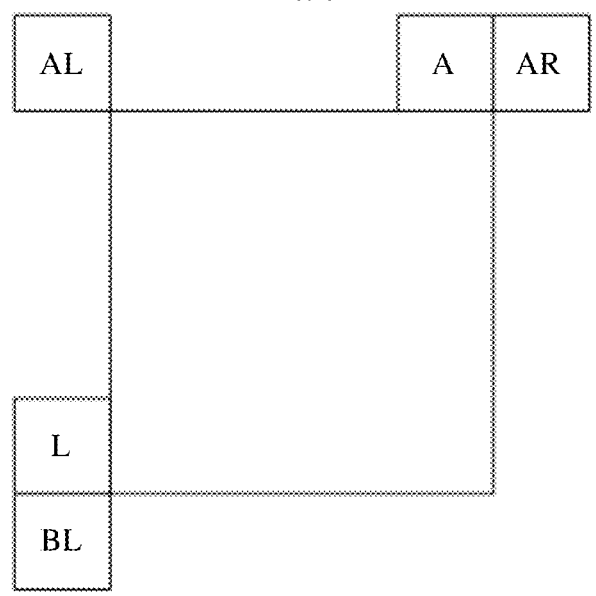
FIG. 7 is a schematic diagram of a candidate prediction mode in an example of an MPM set according to an embodiment of this application.

As an example, the candidate intra-frame prediction modes in (1) may include intra-frame prediction modes in a left (L) position, an upper (A) position, a lower left (BL) position, an upper right (AR) position, and an upper left (AL) position of the current to-be-decoded unit shown in FIG. 7. The candidate intra-frame prediction modes in (2) include a non-directional prediction mode (a DC mode and/or a planar mode), and preset directional prediction modes, for example, a vertical direction mode, a horizontal direction mode, a direction mode whose index number is 2, and an oblique 45-degree direction mode. This is not limited. The candidate intra-frame prediction modes in (3) include candidate intra-frame prediction modes indicated by index numbers differing from index numbers of the candidate intra-frame prediction modes in (1) in the MPM set by 1, and for example, may further include candidate intra-frame prediction modes indicated by index numbers differing from the index numbers of the candidate intra-frame prediction modes in (1) in the MPM set by 2, 3, or another integral value. This is not limited.

It should be understood that, in a process of adding different candidate intra-frame prediction modes to the list of the MPM set, "pruning" needs to be performed at the same time, so as to avoid repeatedly adding a same candidate intra-frame prediction mode to the list of the MPM set, and ensure that each index value in the list of the MPM set represents only one intra-frame prediction mode.

It should be understood that a capacity of the MPM set is preset, that is, the MPM set includes a preset quantity of candidate intra-frame prediction modes. In a process of constructing the list of the MPM set, candidate intra-frame prediction modes are added to the MPM set sequentially in a preset order, until the capacity of the MPM set is reached.

Generally, the preset order includes the candidate intra-frame prediction modes in (1), the preset non-directional candidate intra-frame prediction mode, the candidate intra-frame prediction modes in (3), and the preset directional candidate intra-frame prediction mode. It should be understood that, the preset order reflects only a trend, and a specific implementation order may be reversed and cross-connected. This is not limited.

In conclusion, in a specific embodiment corresponding to the first feasible implementation, it may be checked, in the following order, whether a candidate intra-frame prediction mode is the same as an existing intra-frame prediction mode in the MPM list, an intra-frame prediction mode (index A) of the available reconstruction unit that is directly to the left of the current to-be-decoded unit and that is adjacent to the lower-left corner of the current to-be-decoded unit, an intra-frame prediction mode (index B) of the available reconstruction unit that is directly above the current to-be-decoded unit and that is adjacent to the upper-right corner of the current to-be-decoded unit, the planar mode, the DC mode, an intra-frame prediction mode (C) of the available reconstruction unit on the lower left of the current to-be-decoded unit, an intra-frame prediction mode (D) of the available reconstruction unit on the upper right of the current to-be-decoded unit, an intra-frame prediction mode (E) of the available reconstruction unit on the upper left of the current to-be-decoded unit, an intra-frame prediction mode corresponding to an index (A+1/−1), an intra-frame prediction mode corresponding to an index (B+1/−1), an intra-frame prediction mode corresponding to an index (C+1/−1), an intra-frame prediction mode corresponding to an index (D+1/−1), an intra-frame prediction mode corresponding to an index (E+1/−1), a vertical prediction mode, a horizontal prediction mode, an intra-frame prediction mode corresponding to an index 2, and an oblique 45-degree prediction mode. When the candidate intra-frame prediction mode is not the same as the existing intra-frame prediction mode in the MPM list, and the MPM list is not fully filled, the candidate intra-frame prediction mode is added to the MPM list. The foregoing process may also be represented as follows using code (where uiIntraDirPred[ ] is the list of the MPM set, and modeIdx is an index value of each intra-frame prediction mode in the list):

```
// left
  TComDataCU *cu = getPULeft( partIdx, partIdxLB ),
  if( cu && cu->isIntra(partIdx) )
  {
    uiIntraDirPred[modeIdx] = cu->getIntraDir( chType, partIdx ),
    if( !includedMode[uiIntraDirPred[modeIdx]] )
    {
      includedMode[uiIntraDirPred[modeIdx]] = true,
      modeIdx++,
    }
  }
// above
  cu = getPUAbove( partIdx, partIdxRT ),
  if( cu && cu->isIntra(partIdx) )
  {
    uiIntraDirPred[modeIdx] = cu->getIntraDir( chType, partIdx ),
    if( !includedMode[uiIntraDirPred[modeIdx]] )
    {
      includedMode[uiIntraDirPred[modeIdx]] = true,
      modeIdx++,
    }
  }
  if( piMode )
  {
    *piMode = Int(modeIdx > 1) + 1,
  }
// PLANAR mode
  uiIntraDirPred[modeIdx] = PLANAR_IDX,
  if( !includedMode[uiIntraDirPred[modeIdx]] )
  {
    includedMode[uiIntraDirPred[modeIdx]] = true,
    modeIdx++,
  }
// DC mode
  {
    uiIntraDirPred[modeIdx] = DC_IDX,
    if( !includedMode[uiIntraDirPred[modeIdx]] )
    {
      includedMode[uiIntraDirPred[modeIdx]] = true,
      modeIdx++,
    }
  }
// below left
  {
    cu = getPUBelowLeft( partIdx, partIdxLB ),
    if( cu && cu->isIntra(partIdx) )
    {
      uiIntraDirPred[modeIdx] = cu->getIntraDir( chType, partIdx ),
      if( !includedMode[uiIntraDirPred[modeIdx]] )
      {
        includedMode[uiIntraDirPred[modeIdx]] = true,
        modeIdx++,
      }
    }
  }
// above right
  {
    cu = getPUAboveRight( partIdx, partIdxRT ),
    if( cu && cu->isIntra(partIdx) )
    {
      uiIntraDirPred[modeIdx] = cu->getIntraDir( chType, partIdx ),
      if( !includedMode[uiIntraDirPred[modeIdx]] )
      {
        includedMode[uiIntraDirPred[modeIdx]] = true,
        modeIdx++,
      }
    }
  }
//above left
  if( modeIdx < NUM_MOST_PROBABLE_MODES )
  {
    cu = getPUAboveLeft( partIdx, partIdxLT ),
    if( cu && cu->isIntra(partIdx) )
    {
      uiIntraDirPred[modeIdx] = cu->getIntraDir( chType, partIdx ),
      if( !includedMode[uiIntraDirPred[modeIdx]] )
      {
        includedMode[uiIntraDirPred[modeIdx]] = true,
        modeIdx++,
      }
    }
  }
  UInt numAddedModes = modeIdx,
// −+1 derived modes
  for( UInt idx = 0, idx < numAddedModes && modeIdx < NUM_MOST_PROBABLE_MODES, idx++)
  {
    UInt mode = uiIntraDirPred[idx],
    // directional mode
    if( mode <= DC_IDX )
    {
      continue,
    }
    // −1
    uiIntraDirPred[modeIdx] = ((mode +offset) % mod) + 2,
    if( !includedMode[uiIntraDirPred[modeIdx]] )
    {
      includedMode[uiIntraDirPred[modeIdx]] = true,
      modeIdx++,
    }
    if( modeIdx == NUM_MOST_PROBABLE_MODES )
    {
      break,
    }
    // +1
    uiIntraDirPred[modeIdx] = ((mode − 1) % mod) + 2,
    if( !includedMode[uiIntraDirPred[modeIdx]] )
```

-continued

```
    {
        includedMode[uiIntraDirPred[modeIdx]] = true,
        modeIdx++,
    }
}
// default modes
UInt defaultIntraModes[ ] = {PLANAR_IDX, DC _IDX, VER_IDX,
HOR_IDX, 2, DIA _IDX},
assert( modeIdx > 1),
for( UInt idx = 2, idx < NUM_MOST_PROBABLE_MODES &&
modeIdx < NUM_MOST_PROBABLE_MODES, idx++)
{
    uiIntraDirPred[modeIdx] = defaultIntraModes[idx],
    if( !includedMode[uiIntraDirPred[modeIdx]] )
    {
        includedMode[uiIntraDirPred[modeIdx]] = true,
        modeIdx++,
    }
}
```

In a second feasible implementation, a manner of constructing the list of the MPM set is the same as that in the first feasible implementation. A difference lies in that, in a corresponding specific embodiment corresponding to the second feasible implementation, it is checked, in the following order, whether a candidate intra-frame prediction mode is the same as an existing intra-frame prediction mode in the MPM list, an intra-frame prediction mode (index A) of the available reconstruction unit that is directly to the left of the current to-be-decoded unit and that is adjacent to the lower-left corner of the current to-be-decoded unit, an intra-frame prediction mode (index B) of the available reconstruction unit that is directly above the current to-be-decoded unit and that is adjacent to the upper-right corner of the current to-be-decoded unit, the planar mode, an intra-frame prediction mode (C) of the available reconstruction unit on the lower left of the current to-be-decoded unit, an intra-frame prediction mode (D) of the available reconstruction unit on the upper right of the current to-be-decoded unit, an intra-frame prediction mode (E) of the available reconstruction unit on the upper left of the current to-be-decoded unit, the DC mode, an intra-frame prediction mode corresponding to an index (A+1/−1), an intra-frame prediction mode corresponding to an index (B+1/−1), an intra-frame prediction mode corresponding to an index (C+1/−1), an intra-frame prediction mode corresponding to an index (D+1/−1), an intra-frame prediction mode corresponding to an index (E+1/−1), a vertical prediction mode, a horizontal prediction mode, an intra-frame prediction mode corresponding to an index 2, and an oblique 45-degree prediction mode. When the candidate intra-frame prediction mode is not the same as the existing intra-frame prediction mode in the MPM list, and the MPM list is not fully filled, the candidate intra-frame prediction mode is added to the MPM list. In other words, on the basis of the specific embodiment corresponding to the first feasible implementation, the DC mode is put after the intra-frame prediction mode of the available reconstruction unit on the upper left of the current to-be-decoded unit.

In a third feasible implementation, the candidate intra-frame prediction modes in the MPM set include intra-frame prediction modes whose use frequencies are ranked in the top N in descending order in the intra-frame prediction modes of the available neighborhood reconstruction units in the preset positions of the current to-be-decoded unit, where N is a preset non-zero positive number.

Correspondingly, before step S5001, the method further includes the following step.

Figure 8:
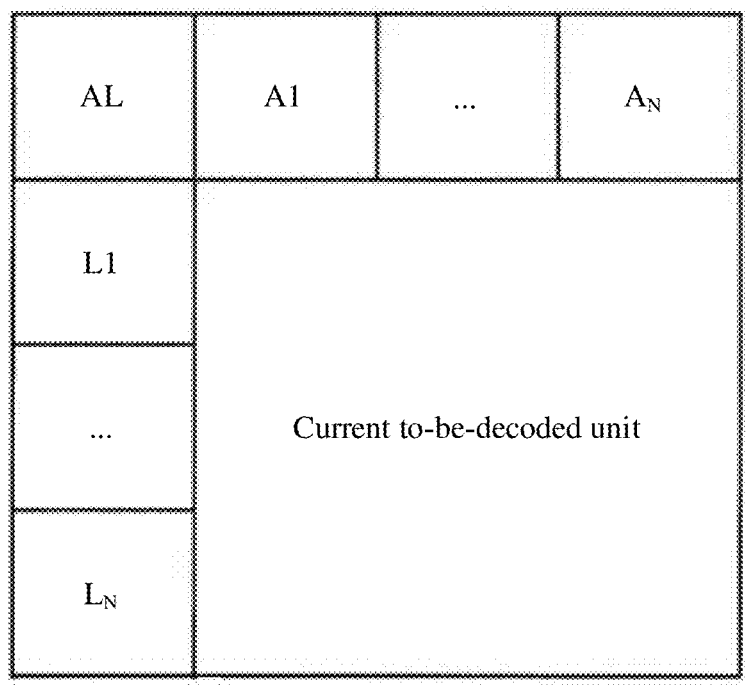
FIG. 8 is a schematic diagram of an example of adjacent reconstruction units of a current to-be-processed unit according to an embodiment of this application.
Figure 9:
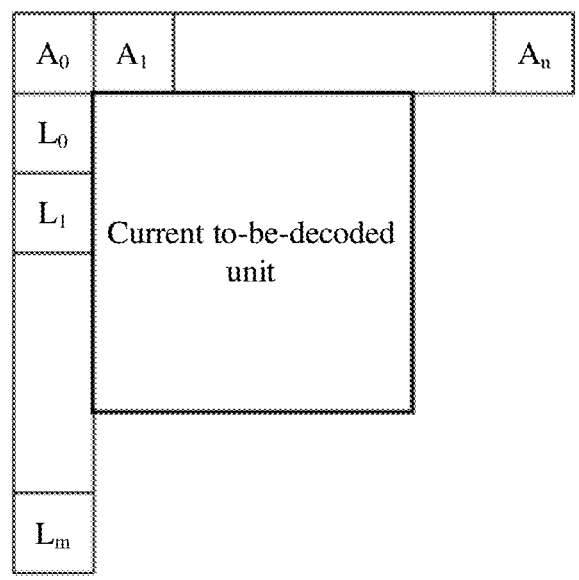
FIG. 9 is a schematic diagram of another example of adjacent reconstruction units of a current to-be-processed unit according to an embodiment of this application.

Step S5002: Collect statistics about use frequencies of intra-frame prediction modes of the available neighborhood reconstruction units in the preset positions of the current to-be-decoded unit. In a feasible implementation, the neighborhood reconstruction units in the preset positions include a reconstruction unit adjacent to the current to-be-decoded unit, as shown in FIG. 8. In another feasible implementation, the neighborhood reconstruction units in the preset positions further include reconstruction units on an extension line of an upper boundary of the current to-be-decoded unit and an extension line of a left boundary of the current to-be-decoded unit, as shown in FIG. 9. As an example, this step may include obtaining intra-frame prediction modes used by 4×4 luminance reconstruction pixel units adjacent to the current to-be-decoded unit in the available neighborhood reconstruction units in the preset positions of the current to-be-decoded unit, accumulating same intra-frame prediction modes that are obtained, and obtaining an accumulated quantity of each of the plurality of preset candidate intra-frame prediction modes.

It should be understood that, when a quantity of types of the intra-frame prediction modes of the available neighborhood reconstruction units in the preset positions of the current to-be-decoded unit is less than the capacity of the MPM set, an intra-frame prediction mode in a prediction direction adjacent to the candidate intra-frame prediction mode that exists in the MPM set or a preset intra-frame prediction mode may be added to the list of the MPM set in a manner similar to the first feasible implementation, until the quantity of candidate intra-frame prediction modes in the MPM set reaches a preset value.

It should be understood that obtaining the first identifier through parsing and constructing the first mode set are processes independent of each other in terms of time. The first identifier may be obtained through parsing before the first mode set is constructed, the first identifier may be obtained through parsing after the first mode set is constructed, or the two processes may be performed in parallel. This is not limited.

S5003: Parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit.

In other words, the candidate intra-frame prediction mode indicated by the second identifier is used as the intra-frame prediction mode of the current to-be-decoded unit.

In a feasible implementation, a unary code is used for the second identifier, where when the candidate intra-frame prediction mode indicated by the second identifier is arranged in a more forward position in the first mode set, a codeword length of the second identifier is shorter.

In a specific embodiment corresponding to the first feasible implementation, different codewords may be assigned to second identifiers that represent different intra-frame prediction modes in the following manner.

TABLE 2

Codeword allocation manner for the second identifier

| Intra-frame prediction modes | Second identifier codewords |
| --- | --- |
| Index A | 0 |
| Index B | 10 |
| Planar | 110 |

TABLE 2-continued

Codeword allocation manner for the second identifier

| Intra-frame prediction modes | Second identifier codewords |
|---|---|
| DC | 1110 |
| Index C | 11110 |
| Index D | 11111 |

In a specific embodiment corresponding to the second feasible implementation, different codewords may be assigned to second identifiers that represent different intra-frame prediction modes in the following manner.

TABLE 3

Codeword allocation manner for the second identifier

| Intra-frame prediction modes | Second identifier codewords |
|---|---|
| Index A | 0 |
| Index B | 10 |
| Planar | 110 |
| Index C | 1110 |
| Index D | 11110 |
| DC | 11111 |

TABLE 4

Another codeword allocation manner for the second identifier

| Intra-frame prediction modes | Second identifier codewords |
|---|---|
| Index A | 0 |
| Index B | 10 |
| Index C | 110 |
| Index D | 1110 |
| Index E | 11110 |
| DC | 11111 |

TABLE 5

Still another codeword allocation manner for the second identifier

| Intra-frame prediction modes | Second identifier codewords |
|---|---|
| Index A | 0 |
| Planar | 10 |
| Index C | 110 |
| Index E | 1110 |
| DC | 11110 |
| Index (A − 1) | 11111 |

It can be learnt that a codeword length of the second identifier indicating one (the DC mode) of the at least one non-directional prediction mode as the intra-frame prediction mode of the current to-be-decoded unit is not less than a codeword length of any second identifier indicating an intra-frame prediction mode (the intra-frame prediction modes represented by the indexes A to E) of an available neighborhood reconstruction unit in a preset position of the current to-be-decoded unit as the intra-frame prediction mode of the current to-be-decoded unit.

In a specific embodiment corresponding to the third feasible implementation, different codewords may be assigned to second identifiers that represent different intra-frame prediction modes in the following manner.

TABLE 6

Codeword allocation manner for the second identifier

| Intra-frame prediction modes | Second identifier codewords |
|---|---|
| Intra-frame prediction mode that appears most frequently in a periphery | 0 |
| Intra-frame prediction mode that appears second most frequently in the periphery | 10 |
| Intra-frame prediction mode that appears third most frequently in the periphery | 110 |
| Intra-frame prediction mode that appears fourth most frequently in the periphery | 1110 |
| Intra-frame prediction mode that appears fifth most frequently in the periphery | 11110 |
| Planar | 11111 |

TABLE 7

Still another codeword allocation manner for the second identifier

| Intra-frame prediction modes | Second identifier codewords |
|---|---|
| Intra-frame prediction mode that appears most frequently in a periphery | 0 |
| Intra-frame prediction mode that appears second most frequently in the periphery | 10 |
| Intra-frame prediction mode that appears third most frequently in the periphery | 110 |
| Planar | 1110 |
| DC | 11110 |
| Index of the intra-frame prediction mode that appears most frequently in the periphery minus 1 | 11111 |

It can be learnt that, when a candidate intra-frame prediction mode indicated by the second identifier as the intra-frame prediction mode of the current to-be-decoded unit appears more frequently, a codeword length of the second identifier is shorter.

It should be understood that the unary code is applicable to encoding of different elements in a same set that have different use probabilities. A shorter codeword is assigned to an element having a higher use probability, and a longer codeword is assigned to an element having a lower use probability. With a basic technical objective of distinguishing different elements in a same set, this reduces a bit rate of an encoding index, and further improves encoding and decoding efficiency.

S5004: Parse the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set.

It may be assumed that the second mode set is the set of selected modes, and correspondingly the third identifier is a flag identifying whether the intra-frame prediction mode of the current to-be-decoded unit finally selected by the encoder side is from the set of selected modes. For example, when the third identifier is "1", it indicates that the intra-frame prediction mode of the current to-be-decoded unit comes from the set of selected modes, or when the third identifier is "0", it indicates that the intra-frame prediction mode of the current to-be-decoded unit does not belong to the set of selected modes.

It should be understood that the second mode set is a subset of the plurality of preset candidate intra-frame prediction modes, and there is no intersection between the second mode set and the first mode set.

In a fourth feasible implementation, candidate intra-frame prediction modes in the set of selected modes include directional prediction modes obtained through sampling at a preset direction interval. As an example, the candidate intra-frame prediction modes in the set of selected modes may include intra-frame prediction modes that are not included in the MPM set and whose index numbers are {0, 4, 8, 12, . . . , 60}.

In a fifth feasible implementation, the candidate intra-frame prediction modes in the set of selected modes include an intra-frame prediction mode that represents an adjacent prediction direction of a directional prediction mode in the first mode set. As an example, after it is determined, based on the third identifier, that the intra-frame prediction mode of the current to-be-decoded unit belongs to the second mode set, the method further includes constructing the second mode set using an intra-frame prediction mode with a first direction interval from the directional prediction mode in the first mode set, until a quantity of candidate intra-frame prediction modes in the second mode set reaches a second preset value, where the first direction interval is a non-zero integer. After the construction of the second mode set is completed, and when the quantity of candidate intra-frame prediction modes in the second mode set does not reach the second preset value, the method further includes adding, to the second mode set, an intra-frame prediction mode with an increased first direction interval from the directional prediction mode in the first mode set, until the quantity of candidate intra-frame prediction modes in the second mode set reaches the second preset value, where an absolute value of the increased first direction interval is greater than an absolute value of the first direction interval. For example, the candidate intra-frame prediction modes in the set of selected modes may be constructed based on prediction modes that represent adjacent prediction directions of the directional prediction modes in the MPM set (for example, intra-frame prediction modes corresponding to the MPM prediction mode indexes plus 2 and\or minus 2. These candidate intra-frame prediction modes cannot exist in the MPM set at the same time. Further, when the constructed candidate intra-frame prediction modes are smaller than a preset capacity of the set of selected modes, the direction interval may be increased. For example, intra-frame prediction modes corresponding to the MPM prediction mode indexes plus 3 and\or minus 3 may be added to the set of selected modes. The direction interval may be further continuously increased until the quantity of candidate intra-frame prediction modes in the set of selected modes reaches the preset value.

It should be understood that, a probability that surrounding blocks of the current to-be-decoded unit are located in the same texture area as the current to-be-decoded unit is relatively high, that is, according to a spatial correlation, the surrounding blocks and the current to-be-decoded unit have a same or similar intra-frame prediction mode. Impact of intra-frame prediction modes of the surrounding blocks is considered during construction of the set of selected modes, so that prior information of encoding of the surrounding blocks is more fully utilized, and encoding efficiency is improved.

In a sixth feasible implementation, when the MPM set includes no non-directional prediction mode, the set of selected modes may further include a non-directional prediction mode. As an example, when the MPM set does not include the planar mode, the set of selected modes may further include the planar mode. When the MPM set does not include the DC mode, the set of selected modes may further include the DC mode.

In a seventh feasible implementation, the candidate intra-frame prediction modes in the set of selected modes include intra-frame prediction modes whose use frequencies are ranked in the top N in descending order in the intra-frame prediction modes of the available neighborhood reconstruction units in the preset positions of the current to-be-decoded unit, where N is a preset non-zero positive number, and the N intra-frame prediction modes are not included in the MPM set. In a feasible implementation, the foregoing intra-frame prediction modes are added to the set of selected modes in descending order of the use frequencies, until the quantity of candidate intra-frame prediction modes in the set of selected modes reaches a preset quantity. In a feasible implementation, when the intra-frame prediction modes whose use frequencies are ranked in the top N in descending order in the intra-frame prediction modes of the available neighborhood reconstruction units in the preset positions of the current to-be-decoded unit are already used as intra-frame prediction modes in the MPM set, intra-frame prediction modes whose use frequencies are ranked $(N+1)^{th}$ to $M^{th}$ in descending order are used as candidate intra-frame prediction modes in the set of selected modes, where M is a preset non-zero positive number, and M is greater than N. For a specific implementation, refer to the third feasible implementation. Details are not described again.

It should be understood that, in this feasible implementation, impact of intra-frame prediction modes of surrounding blocks is also more fully considered, so that prior information of encoding of the surrounding blocks is more fully utilized, and encoding efficiency is improved.

It should be understood that the fourth to the seventh feasible implementations provide several independent implementations of constructing the set of selected modes as examples. When any feasible implementation cannot make the candidate intra-frame prediction modes in the set of selected modes reach the preset quantity, the set of selected modes may be constructed in combination with an implementation method in another feasible implementation. The construction is not limited to an independent implementation, and a manner of combining different implementations is not limited.

It should be understood that obtaining the third identifier through parsing and constructing the second mode set are processes independent of each other in terms of time. The third identifier may be obtained through parsing before the second mode set is constructed, the third identifier may be obtained through parsing after the second mode set is constructed, or the two processes may be performed in parallel. This is not limited.

S5005: Parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In other words, the candidate intra-frame prediction mode indicated by the fourth identifier is used as the intra-frame prediction mode of the current to-be-decoded unit.

In a feasible implementation, a fixed-length code is used for the fourth identifier. As an example, when the quantity of candidate intra-frame prediction modes in the set of selected modes is 16, each candidate intra-frame prediction mode in the set of selected modes is encoded/decoded using a 4-bit fixed-length codeword.

TABLE 8

Codeword allocation manner for the fourth identifier

| Intra-frame prediction modes | Fourth identifier codewords |
|---|---|
| First intra-frame prediction mode | 0000 |
| Second intra-frame prediction mode | 0001 |
| Third intra-frame prediction mode | 0010 |
| Fourth intra-frame prediction mode | 0011 |
| Fifth intra-frame prediction mode | 0100 |
| ... | ... |

S5006: Parse the bitstream to obtain a fifth identifier when it is determined, based on the third identifier, that the intra-frame prediction mode of the current to-be-decoded unit does not belong to the second mode set, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In other words, the candidate intra-frame prediction mode indicated by the fifth identifier is used as the intra-frame prediction mode of the current to-be-decoded unit. The candidate intra-frame prediction modes other than the intra-frame prediction modes in the first mode set and the second mode set in the plurality of preset candidate intra-frame prediction modes are referred to as candidate intra-frame prediction modes in the set of non-selected modes in some embodiments, and are referred to as remaining candidate intra-frame prediction modes (remaining modes) in some other embodiments. This is not limited.

In a feasible implementation, a truncated binary code is used for the fifth identifier.

TABLE 9

Codeword allocation manner for the fifth identifier (five intra-frame prediction modes are used as an example)

| Intra-frame prediction modes | Fifth identifier codewords |
|---|---|
| First intra-frame prediction mode | 00 |
| Second intra-frame prediction mode | 01 |
| Third intra-frame prediction mode | 10 |
| Fourth intra-frame prediction mode | 110 |
| Fifth intra-frame prediction mode | 111 |

It should be understood that the first to the third feasible implementations describe manners of constructing the MPM set, and the fourth to the seventh feasible implementations describe manners of constructing the set of selected modes. In different specific embodiments, there may be different combinations of a manner of constructing the MPM set and a manner of constructing the set of selected modes. A specific combination manner is not limited.

In a specific implementation solution, the 67 preset candidate intra-frame prediction modes are divided into 6 candidate intra-frame prediction modes belonging to the MPM set, 16 candidate intra-frame prediction modes belonging to the set of selected, and remaining candidate intra-frame prediction modes belonging to the set of non-selected. The following steps exist.

S6001: Decode an MPM_flag, where if the MPM_flag is 1, it indicates that the prediction mode is an MPM mode, and derive an intra-frame prediction mode based on an MPM index obtained through decoding and the MPM prediction mode list. A unary code decoding manner is used for the MPM index, and a process of constructing the MPM prediction mode list is as follows (referring to a position relationship of blocks in FIG. 7).

1. If an L block exists and has an intra-frame prediction mode, add the prediction mode of the L block to the MPM list.

2. If an A block exists and has an intra-frame prediction mode, and if the prediction mode of the A block has not been added to the MPM list, add the prediction mode of the A block to the MPM list.

3. If the planar mode has not been added to the MPM list, add the planar mode to the MPM list.

4. If a BL block exists and has an intra-frame prediction mode, and if the prediction mode of the BL block has not been added to the MPM list, add the prediction mode of the BL block to the MPM list.

5. If an AR block exists and has an intra-frame prediction mode, and if the prediction mode of the AR block has not been added to the MPM list, add the prediction mode of the AR block to the MPM list.

6. If an AL block exists and has an intra-frame prediction mode, and if the prediction mode of the AL block has not been added to the MPM list, add the prediction mode of the AL block to the MPM list.

7. If there are less than six prediction modes in the MPM list and the DC mode has not been added to the list, add the DC prediction mode to the MPM list.

8. If a quantity of prediction modes in the MPM list is less than 6, sequentially add, in a sequence of added modes in the existing MPM list, adjacent angle prediction modes of angle prediction modes (angle_mode modes other than the planar mode and the DC mode) in the MPM list, that is, angle_mode−1 and angle_mode+1. As shown in FIG. 6, when the angle mode is 2, angle_mode−1 corresponds to adding the mode 66. When the angle mode is 66, angle_mode+1 corresponds to adding the mode 2. If the quantity of modes in the MPM list reaches 6, the process stops.

9. If the quantity of prediction modes in the MPM list is less than 6, sequentially add modes in a default mode list that have not been added, that is, {Planar, DC, Ver (vertical mode), Hor (horizontal mode), 2, DIA (diagonal mode 34, that is, oblique 45-degree mode)}.

S6002: If the MPM_flag is 0, decode a selected_flag, where if the selected_flag is 1, it indicates that the prediction mode currently selected for decoding is a selected mode, and decode a selected mode index, and then derive the prediction mode based on the constructed list of selected modes, where a decoding manner with a 4-bit fixed-length code is used for the selected mode index, and a process of constructing the selected modes is as follows.

Sixteen prediction modes of remaining prediction modes other than the MPM modes are selected as the selected modes. Adjacent angle prediction modes of the angle modes are sequentially added in a sequence of the angle prediction modes in the MPM list. An angle interval is a multiple of 2. For example, an angle interval added for the first time is 2, that is, angle_mode−2, and angle_mode+2. If the quantity of selected modes is still less than 16 after all the angle modes in the MPM list are traversed, adjacent angle modes with an angle interval of 4 continue to be added. By analogy, an angle interval is gradually increased until 16 modes are selected. In the adding process, it needs to be ensured that an angle mode to be added has not been added and is not an MPM mode. In the adding process, adjacent angles of angle modes circulate based on mod=65, that is, the mode 2 and the mode 66 are adjacent angle modes. It should be understood that the angle interval may alternatively be a multiple of 1, a multiple of 3, or the like. This is not limited, provided that the angle interval is agreed on by the encoder side in advance in a protocol.

This process may be represented by a pseudocode as follows.

TABLE 10

Process of constructing selected modes

```
offset = 62
mod = 65
offsetAng = 1
while( selectedIdx < 16) {
    for( idx = 0, idx < 6 && selectedIdx < 16, idx++) {
        mode = mpmList[idx]
        if(mode==Planar or mode==DC) {
            continue
        }
        // -2x angle
        selectedMode[selecedIdx] = ((mode + offset - offsetAng) % mod) + 2
        if( !selectedMode[selectedIdx]Added) {
            selecedIdx++
        }
        // +2x angle
        if(selectedIdx < 16) {
            selectedMode[selectedIdx] = ((mode - 1 + offsetAng) % mod) + 2,
            if( !selectedMode[selectedIdx]Added) {
                selecedIdx++
            }
        }
        offsetAng += 2
    }
}
```

S6003: If the selected_flag is 0, it indicates that the prediction mode currently selected for decoding is a mode in the set of non-selected, and decode a mode index, and derive a prediction mode, where the index of the non-selected mode may be expressed as a truncated binary code.

The solution is implemented in a test model HM16.6-JEM-6.0 of the H.266 standard being developed, uses the original HM16.6-JEM-6.0 as a reference, and performs a test under a general test condition recommended by the JVET standard organization. According to the solution, luminance performance improvement about 0.15% may be obtained on average. Specific performance improvement is shown in the following table.

TABLE 11

Technical performance analysis

| | Increase in luminance bit rate | Increase in first chrominance bit rate | Increase in second chrominance bit rate |
| --- | --- | --- | --- |
| A1 type sequence | −0.14% | −0.07% | −0.10% |
| A2 type sequence | −0.13% | −0.07% | −0.09% |
| B type sequence | −0.07% | −0.03% | −0.09% |
| C type sequence | −0.13% | −0.05% | −0.03% |
| D type sequence | −0.13% | −0.01% | −0.02% |
| E type sequence | −0.26% | −0.13% | −0.25% |
| Total | −0.14% | −0.06% | −0.09% |

In another specific implementation solution, the 67 preset candidate intra-frame prediction modes are divided into 6 candidate intra-frame prediction modes belonging to the MPM set, 16 candidate intra-frame prediction modes belonging to the set of selected, and remaining candidate intra-frame prediction modes belonging to the set of non-selected. The following steps exist.

S7001: Collect statistics about intra-frame prediction modes used by adjacent decoded blocks of the current decoding block using a coding unit: a 4×4 pixel block with a minimum luminance component as a statistical unit.

S7002: Decode an MPM_flag, where if the MPM_flag is 1, it indicates that the prediction mode is an MPM mode, decode an MPM index, and arrange an intra-frame prediction mode that is most frequently selected in a most forward position of the MPM list based on a use probability, where when a mode is arranged in a more forward position, fewer bits are used to decode an MPM index corresponding to the mode.

S7003: If the MPM_flag is 0, decode a selected_flag, where if the selected_flag is 1, it indicates that the prediction mode currently selected for decoding is a selected mode, decode a selected mode index, add, to the list of selected modes, a prediction mode of an adjacent block that has not been added to the MPM list, if the list is not full, add an adjacent angle mode of the MPM mode and the adjacent block prediction mode as a selected mode, and increase the adjacent angle interval gradually until 16 selected modes are filled in, where the adjacent angle interval may be increased sequentially in an order of 1, 2, 3, 4, and the like, until the list of selected modes is fully filled, and a decoding manner with a 4-bit fixed-length code is used for the selected mode index.

S7004: If the selected_flag is 0, it indicates that the prediction mode currently selected for decoding is a mode in the set of non-selected, and decode a mode index, and derive a prediction mode, where the index of the non-selected mode may be expressed as a truncated binary code.

The foregoing feasible implementations and specific embodiments related to FIG. 5 describe one or more methods for decoding video data through intra-frame prediction according to this application. It should be understood that, according to the foregoing description, generally, the encoder side selects, from a plurality of candidate intra-frame prediction modes according to a criterion such as rate-distortion, a candidate intra-frame prediction mode with a lowest encoding cost as an intra-frame prediction mode that is finally selected by a current to-be-encoded unit (corresponding to the current to-be-decoded unit) and encoded into a bitstream. After the finally selected intra-frame prediction mode is selected, an indication (for example, the first identifier, the second identifier, the third identifier, the fourth identifier, and the fifth identifier in the foregoing description) of the intra-frame prediction mode is encoded into the bitstream according to an encoding process completely inverse to the foregoing decoding method (corresponding to parsing the first identifier, the second identifier, the third identifier, the fourth identifier, and the fifth identifier in the decoding process). It should be understood that construction of the first mode set and the second mode set is completely consistent for an encoder side and a decoder side. A specific embodiment for the encoder side is not described. However, it should be understood that the intra-frame prediction method described in the present application is also applicable to an encoding method.

Figure 10:
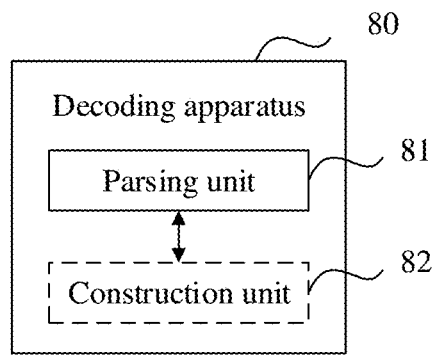
FIG. 10 is a block diagram of a video data decoding apparatus in one or more feasible implementations described in an embodiment of this application.

FIG. 10 is a block diagram of a video data decoding apparatus in one or more feasible implementations described in an embodiment of this application.

An apparatus 80 for decoding an intra-frame prediction mode includes a parsing unit 81 configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, where the parsing unit 81 is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

In a feasible implementation, when it is determined, based on the first identifier, that the intra-frame prediction mode of the current to-be-decoded unit does not belong to the first mode set, the parsing unit 81 is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and candidate intra-frame prediction modes in the second mode set include directional prediction modes obtained through sampling at a preset direction interval, parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit, and parse the bitstream to obtain a fifth identifier when it is determined, based on the third identifier, that the intra-frame prediction mode of the current to-be-decoded unit does not belong to the second mode set, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation, the candidate intra-frame prediction modes in the first mode set are different from each other, and the candidate intra-frame prediction modes in the second mode set are different from each other.

In a feasible implementation, the directional prediction modes include prediction modes represented by a plurality of prediction directions that are distributed at equal angular intervals between any two directions of 180 degrees on a two-dimensional plane.

In a feasible implementation, the non-directional prediction modes include a direct current mode and a planar mode.

In a feasible implementation, the available neighborhood reconstruction units in the preset positions of the current to-be-decoded unit include neighborhood reconstruction units, in preset positions, that belong to the same coding unit set as the current to-be-decoded unit and that obtain a predictor through intra-frame prediction.

In a feasible implementation, the coding unit set includes a picture, a slice, or a tile.

In a feasible implementation, the neighborhood reconstruction units in the preset positions include a reconstruction unit that is directly to the left of the current to-be-decoded unit and that is adjacent to a lower-left corner of the current to-be-decoded unit, a reconstruction unit that is directly above the current to-be-decoded unit and that is adjacent to an upper-right corner of the current to-be-decoded unit, a reconstruction unit in a lower-left adjacent position, a reconstruction unit in an upper-right adjacent position, and a reconstruction unit in an upper-left adjacent position.

In a feasible implementation, the decoding apparatus 80 further includes a construction unit 82 configured to after it is determined, based on the first identifier, that the intra-frame prediction mode of the current to-be-decoded unit belongs to the first mode set, construct the first mode set in a sequence of an intra-frame prediction mode of the available reconstruction unit that is directly to the left of the current to-be-decoded unit and that is adjacent to the lower-left corner of the current to-be-decoded unit, an intra-frame prediction mode of the available reconstruction unit that is directly above the current to-be-decoded unit and that is adjacent to the upper-right corner of the current to-be-decoded unit, the planar prediction mode, an intra-frame prediction mode of the available reconstruction unit on the lower left of the current to-be-decoded unit, an intra-frame prediction mode of the available reconstruction unit on the upper right of the current to-be-decoded unit, an intra-frame prediction mode of the available reconstruction unit on the upper left of the current to-be-decoded unit, and the direct current mode, until a quantity of candidate intra-frame prediction modes in the first mode set reaches a first preset value, where the candidate intra-frame prediction modes in the first mode set are different from each other.

In a feasible implementation, after the construction of the first mode set is completed, and when the quantity of candidate intra-frame prediction modes in the first mode set does not reach the first preset value, the construction unit 82 is further configured to add, to the first mode set, an intra-frame prediction mode that represents an adjacent prediction direction of a directional prediction mode in the first mode set.

In a feasible implementation, a unary code is used for the second identifier, where when the candidate intra-frame prediction mode indicated by the second identifier is arranged in a more forward position in the first mode set, a codeword length of the second identifier is shorter.

In a feasible implementation, the candidate intra-frame prediction modes in the second mode set include an intra-frame prediction mode that represents an adjacent prediction direction of the directional prediction mode in the first mode set.

In a feasible implementation, after it is determined, based on the third identifier, that the intra-frame prediction mode of the current to-be-decoded unit belongs to the second mode set, the construction unit 82 is further configured to construct the second mode set using an intra-frame prediction mode with a first direction interval from the directional prediction mode in the first mode set, until a quantity of candidate intra-frame prediction modes in the second mode set reaches a second preset value, where the first direction interval is a non-zero integer.

In a feasible implementation, after the construction of the second mode set is completed, and when the quantity of candidate intra-frame prediction modes in the second mode set does not reach the second preset value, the construction unit 82 is further configured to add, to the second mode set, an intra-frame prediction mode with an increased first direction interval from the directional prediction mode in the first mode set, until the quantity of candidate intra-frame prediction modes in the second mode set reaches the second preset value, where an absolute value of the increased first direction interval is greater than an absolute value of the first direction interval.

In a feasible implementation, before constructing the second mode set using the intra-frame prediction mode with the first direction interval from the directional prediction mode in the first mode set, the construction unit 82 is further configured to construct the second mode set using a first non-directional prediction mode, where the first mode set does not include the first non-directional prediction mode.

Figure 11:
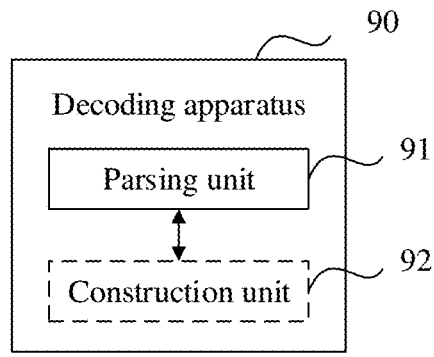
FIG. 11 is a block diagram of a video data decoding apparatus in one or more feasible implementations described in an embodiment of this application.

FIG. 11 is a block diagram of a video data decoding apparatus in one or more feasible implementations described in an embodiment of this application.

An apparatus 90 for decoding an intra-frame prediction mode includes a parsing unit 91 configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, where the parsing unit 91 is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, the parsing unit 91 is further configured to parse the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and the parsing unit 91 is further configured to parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In a feasible implementation, the candidate intra-frame prediction modes in the first mode set are different from each other, and the candidate intra-frame prediction modes in the second mode set are different from each other.

In a feasible implementation, when it is determined, based on the third identifier, that the intra-frame prediction mode of the current to-be-decoded unit does not belong to the second mode set, the parsing unit 91 is further configured to parse the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation, the parsing unit 91 further includes a construction unit 92 configured to, after it is determined, based on the third identifier, that the intra-frame prediction mode of the current to-be-decoded unit belongs to the second mode set, construct the second mode set using an intra-frame prediction mode with a first direction interval from the directional prediction mode in the first mode set, until a quantity of candidate intra-frame prediction modes in the second mode set reaches a third preset value, where the first direction interval is a non-zero integer.

In a feasible implementation, after the construction of the second mode set is completed, and when the quantity of candidate intra-frame prediction modes in the second mode set does not reach the third preset value, the construction unit 92 is further configured to add, to the second mode set, an intra-frame prediction mode with an increased first direction interval from the directional prediction mode in the first mode set, until the quantity of candidate intra-frame prediction modes in the second mode set reaches the third preset value, where an absolute value of the increased first direction interval is greater than an absolute value of the first direction interval.

In a feasible implementation, before constructing the second mode set using the intra-frame prediction mode with the first direction interval from the directional prediction mode in the first mode set, the construction unit 92 is further configured to construct the second mode set using a first non-directional prediction mode, where the first mode set does not include the first non-directional prediction mode.

Figure 12:
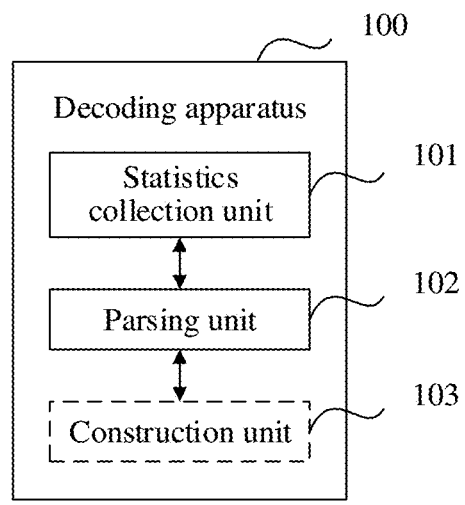
FIG. 12 is a block diagram of a video data decoding apparatus in one or more feasible implementations described in an embodiment of this application.

FIG. 12 is a block diagram of a video data decoding apparatus in one or more feasible implementations described in an embodiment of this application.

An apparatus 100 for decoding an intra-frame prediction mode includes a statistics collection unit 101 configured to collect statistics about use frequencies of intra-frame prediction modes of available neighborhood reconstruction units in preset positions of a current to-be-decoded unit, and a parsing unit 102 configured to parse a bitstream to obtain a first identifier, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, where the parsing unit 102 is further configured to parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and when a candidate intra-frame prediction mode indicated by the second identifier as the intra-frame prediction mode of the current to-be-decoded unit is more frequently used, a codeword length of the second identifier is shorter.

In a feasible implementation, when it is determined, based on the first identifier, that the intra-frame prediction mode of the current to-be-decoded unit does not belong to the first mode set, the parsing unit 102 is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In a feasible implementation, the candidate intra-frame prediction modes in the first mode set are different from each other, and the candidate intra-frame prediction modes in the second mode set are different from each other.

In a feasible implementation, when it is determined, based on the third identifier, that the intra-frame prediction mode of the current to-be-decoded unit does not belong to the second mode set, the parsing unit 102 is further configured to parse the bitstream to obtain a fifth identifier, where the fifth identifier is used to indicate a candidate intra-frame prediction mode that is in candidate intra-frame prediction modes other than the intra-frame prediction modes in the first mode set and the second mode set in the plurality of preset candidate intra-frame prediction modes and that is used as the intra-frame prediction mode of the current to-be-decoded unit.

In a feasible implementation, the statistics collection unit 101 is configured to obtain intra-frame prediction modes used by 4×4 luminance reconstruction pixel units adjacent to the current to-be-decoded unit in the available neighborhood reconstruction units in the preset positions of the current to-be-decoded unit, accumulate same intra-frame prediction modes that are obtained, and obtain an accumulated quantity of each of the plurality of preset candidate intra-frame prediction modes.

In a feasible implementation, the neighborhood reconstruction units in the preset positions include reconstruction units adjacent to the current to-be-decoded unit.

In a feasible implementation, the preset positions further include reconstruction units on an extension line of an upper boundary of the current to-be-decoded unit and an extension line of a left boundary of the current to-be-decoded unit.

In a feasible implementation, the parsing unit 100 further includes a construction unit 103. When (M−N) is less than a fourth preset value, the construction unit 103 is configured to add, to the second mode set, an intra-frame prediction mode with a first direction interval from a directional prediction mode in the first mode set or the second mode set, until a quantity of candidate intra-frame prediction modes in the second mode set reaches the fourth preset value, where the first direction interval is a non-zero integer.

In a feasible implementation, when the quantity of candidate intra-frame prediction modes in the second mode set does not reach the fourth preset value after the intra-frame prediction mode with the first direction interval from the directional prediction mode in the first mode set or the second mode set is added to the second mode set, the construction unit 103 is further configured to add, to the second mode set, an intra-frame prediction mode with an increased first direction interval from the directional prediction mode in the first mode set or the second mode set, until the quantity of candidate intra-frame prediction modes in the second mode set reaches the fourth preset value, where an absolute value of the increased first direction interval is greater than an absolute value of the first direction interval.

Figure 13:
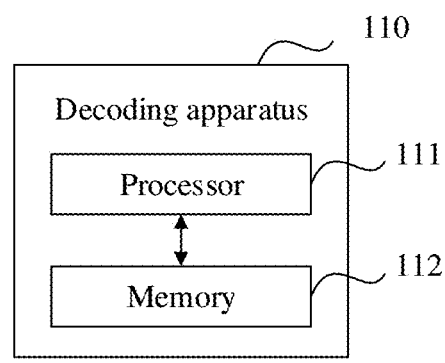
FIG. 13 is a block diagram of a video data decoding apparatus in one or more feasible implementations described in an embodiment of this application.

FIG. 13 is a block diagram of a video data decoding apparatus in one or more feasible implementations described in an embodiment of this application.

An apparatus 110 for decoding an intra-frame prediction mode includes a processor 111 and a memory 112 coupled to the processor, where the processor 111 is configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, and parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and a codeword length of the second identifier indicating one of the at least one non-directional prediction mode as the intra-frame prediction mode of the current to-be-decoded unit is not less than a codeword length of any second identifier indicating an intra-frame prediction mode of an available neighborhood reconstruction unit in a preset position of the current to-be-decoded unit as the intra-frame prediction mode of the current to-be-decoded unit.

In another embodiment, an apparatus 110 for decoding an intra-frame prediction mode includes a processor 111 and a memory 112 coupled to the processor, where the processor 111 is configured to parse a bitstream to obtain a first identifier, where the first identifier is used to indicate that an intra-frame prediction mode of a current to-be-decoded unit belongs to a first mode set, the first mode set is a subset of a plurality of preset candidate intra-frame prediction modes, and the first mode set includes intra-frame prediction modes of available neighborhood reconstruction units in preset positions of the current to-be-decoded unit and at least one non-directional prediction mode, parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, parse the bitstream to obtain a third identifier when it is determined, based on the first identifier, that the intra-frame prediction mode of the current to-be-decoded unit does not belong to the first mode set, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

In still another embodiment, an apparatus 110 for decoding an intra-frame prediction mode includes a processor 111 and a memory 112 coupled to the processor, where the processor 111 is configured to collect statistics about use frequencies of intra-frame prediction modes of available neighborhood reconstruction units in preset positions of a current to-be-decoded unit, parse a bitstream to obtain a first identifier, where the first identifier is used to indicate that an intra-frame prediction mode of the current to-be-decoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and parse the bitstream to obtain a second identifier when it is determined, based on the first identifier, that the intra-frame prediction mode of the current to-be-decoded unit belongs to the first mode set, where the second identifier is used to indicate a candidate intra-frame prediction mode, in the first mode set, that is used as the intra-frame prediction mode of the current to-be-decoded unit, and when a candidate intra-frame prediction mode indicated by the second identifier as the intra-frame prediction mode of the current to-be-decoded unit is more frequently used, a codeword length of the second identifier is shorter.

In a feasible implementation of this embodiment, when it is determined, based on the first identifier, that the intra-frame prediction mode of the current to-be-decoded unit does not belong to the first mode set, the processor 112 is further configured to parse the bitstream to obtain a third identifier, where the third identifier is used to indicate that the intra-frame prediction mode of the current to-be-decoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and parse the bitstream to obtain a fourth identifier when it is determined, based on the third identifier, that the intra-frame prediction mode of the current to-be-decoded unit belongs to the second mode set, where the fourth identifier is used to indicate a candidate intra-frame prediction mode, in the second mode set, that is used as the intra-frame prediction mode of the current to-be-decoded unit.

The foregoing feasible implementations and specific embodiments related to FIG. 10 to FIG. 13 describe one or more apparatuses for decoding video data through intra-frame prediction according to this application. It should be understood that, according to the foregoing description, generally, the encoder side selects, from a plurality of candidate intra-frame prediction modes according to a criterion such as rate-distortion, a candidate intra-frame prediction mode with a lowest encoding cost as an intra-frame prediction mode that is finally selected by a current to-be-encoded unit (corresponding to the current to-be-decoded unit) and encoded into a bitstream. After the finally selected intra-frame prediction mode is selected, an indication (for example, the first identifier, the second identifier, the third identifier, the fourth identifier, and the fifth identifier in the foregoing description) of the intra-frame prediction mode is encoded into the bitstream according to an encoding process completely inverse to the foregoing decoding method (corresponding to parsing the first identifier, the second identifier, the third identifier, the fourth identifier, and the fifth identifier in the decoding process). It should be understood that construction of the first mode set and the second mode set is completely consistent for an encoder side and a decoder side. A specific embodiment for the encoder side is not described. However, it should be understood that the intra-frame prediction method described in the present application is also applicable to an encoding apparatus.

Figure 14:
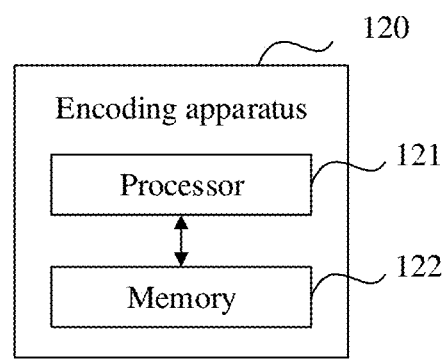
FIG. 14 is a block diagram of a video data encoding apparatus in one or more feasible implementations described in an embodiment of this application.

For example, FIG. 14 is a block diagram of a video data encoding apparatus in one or more feasible implementations described in an embodiment of this application.

An apparatus 120 for encoding an intra-frame prediction mode includes a processor 121 and a memory 122 coupled to the processor, where the processor 121 is configured to encode a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, and encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and a codeword length of the second identifier indicating one of the at least one non-directional prediction mode as the intra-frame prediction mode of the current to-be-encoded unit is not less than a codeword length of any second identifier indicating an intra-frame prediction mode of an available neighborhood reconstruction unit in a preset position of the current to-be-encoded unit as the intra-frame prediction mode of the current to-be-encoded unit.

In another embodiment, an apparatus 120 for encoding an intra-frame prediction mode includes a processor 121 and a memory 122 coupled to the processor, where the processor 121 is configured to encode a first identifier into a bitstream, where the first identifier is used to indicate that an intra-frame prediction mode of a current to-be-encoded unit belongs to a first mode set, the first mode set is a subset of a plurality of preset candidate intra-frame prediction modes, and the first mode set includes intra-frame prediction modes of available neighborhood reconstruction units in preset positions of the current to-be-encoded unit and at least one non-directional prediction mode, encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, encode a third identifier into the bitstream when it is determined, based on the first identifier, that the intra-frame prediction mode of the current to-be-encoded unit does not belong to the first mode set, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, and the candidate intra-frame prediction modes in the second mode set include an intra-frame prediction mode that represents an adjacent prediction direction of a directional prediction mode in the first mode set, and encode a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

In still another embodiment, an apparatus 120 for encoding an intra-frame prediction mode includes a processor 121 and a memory 122 coupled to the processor, where the processor 121 is configured to collect statistics about use frequencies of intra-frame prediction modes of available neighborhood reconstruction units in preset positions of a current to-be-encoded unit, encode a first identifier into a bitstream, where the first identifier is used to indicate that an intra-frame prediction mode of the current to-be-encoded unit belongs to a first mode set, the first mode set is a subset of a plurality of preset candidate intra-frame prediction modes, the first mode set includes intra-frame prediction modes whose use frequencies are ranked in the top N in descending order, and N is a preset non-zero positive number, and encode a second identifier into the bitstream when it is determined, based on the first identifier, that the intra-frame prediction mode of the current to-be-encoded unit belongs to the first mode set, where the second identifier is used to indicate a candidate intra-frame prediction mode, in the first mode set, that is used as the intra-frame prediction mode of the current to-be-encoded unit, and when a candidate intra-frame prediction mode indicated by the second identifier as the intra-frame prediction mode of the current to-be-encoded unit is more frequently used, a codeword length of the second identifier is shorter.

In a feasible implementation of this embodiment, when it is determined, based on the first identifier, that the intra-frame prediction mode of the current to-be-encoded unit does not belong to the first mode set, the processor 122 is further configured to encode a third identifier into the bitstream, where the third identifier is used to indicate that the intra-frame prediction mode of the current to-be-encoded unit belongs to a second mode set, the second mode set is a subset of the plurality of preset candidate intra-frame prediction modes, there is no intersection between the second mode set and the first mode set, the candidate intra-frame prediction modes in the second mode set include intra-frame prediction modes whose use frequencies are ranked $(N+1)^{th}$ to $M^{th}$ in descending order, M is a preset non-zero positive number, and M is greater than N, and encode a fourth identifier into the bitstream when it is determined, based on the third identifier, that the intra-frame prediction mode of the current to-be-encoded unit belongs to the second mode set, where the fourth identifier is used to indicate a candidate intra-frame prediction mode, in the second mode set, that is used as the intra-frame prediction mode of the current to-be-encoded unit.

Although specific aspects of this application have been described with reference to the video encoder 20 and the video decoder 30, it should be understood that the techniques of this application may be applied using many other video encoding and/or coding units, processors, processing units, for example, a hardware-based coding unit of an encoder/decoder (CODEC), and the like. In addition, it should be understood that the steps shown and described in FIG. 5 are provided merely as a feasible implementation. In other words, the steps shown in the feasible implementation of FIG. 5 does not necessarily need to be performed in the order shown in FIG. 5, and fewer, additional, or alternative steps may be performed.

Further, it should be understood that depending on a feasible implementation, specific actions or events of any of the methods described in this specification may be performed in different sequences, an action or event may be added, or the actions or events may be combined, or omitted (for example, not all of the described actions or events are needed for implementing the method). Further, in a particular feasible implementation, the actions or events may undergo multi-threading processing or interrupt processing, or may be processed by a plurality of processors simultaneously instead of sequentially. Further, although a particular aspect of this application is described as being performed by a single module or unit for purposes of clarity, it should be understood that the techniques of this application may be performed by a combination of units or modules associated with a video decoder.

In one or more feasible implementations, the described functions may be implemented by hardware, software, firmware, or any combination thereof. If the functions are implemented using software, the functions may be stored in a computer readable medium as one or more instructions or code or be sent using a computer readable medium, and be performed using a hardware-based processing unit. The computer readable medium may include a computer readable storage medium or a communications medium. The computer readable storage medium is corresponding to a tangible medium such as a data storage medium, and the communication medium includes any medium that facilitates transmission of a computer program from one location to another location according to a communications protocol.

In this manner, the computer readable medium may correspond to, for example, (1) a non-transitory tangible computer readable storage medium, or (2) a communication medium such as a signal or a carrier. The data storage medium may be any available medium that can be accessed by one or more computers or one or more processors to retrieve instructions, code, and/or data structures for implementing the techniques described in this application. A computer program product may include the computer readable medium.

By way of example and not by way of limitation, this computer readable storage medium may include a random access memory (RAM), a read only memory (ROM), an electronically erasable programmable ROM (EEPROM), a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection may be appropriately referred to as a computer readable medium. For example, if an instruction is transmitted from a website, server, or another remote source through a coaxial cable, a fiber optic cable, a twisted pair, a DSL, or wireless technologies such as infrared, radio, and microwave, the coaxial cable, fiber optic cable, twisted pair, DSL, or wireless technologies such as infrared, radio, and microwave are included in a definition of medium.

However, it should be understood that the computer readable storage medium and the data storage medium may not include a connection, a carrier, a signal, or another transitory medium, but are non-transitory tangible storage media. A disk and an optical disc used in this specification include a compact disc (CD), a lightning disc, an optical disc, a DVD, a floppy disk, and a BLU-RAY disc. The disk generally magnetically reproduces data, and the optical disc optically reproduces data through lightning. A combination of the foregoing objects shall be further included in a scope of the computer readable medium.

An instruction may be executed by one or more processors such as one or more digital signal processors, general purpose microprocessors, application-specific integrated circuits, field-programmable gate arrays, or other equivalent integrated or discrete logic circuits. Therefore, the term "processor" used in this specification may represent any one of the foregoing structures or another structure that is applicable to implement the technologies described in this specification. In addition, in some aspects, the function described in this specification may be provided in a dedicated hardware and/or software module configured for encoding and decoding, or may be incorporated into a combined codec. In addition, the technologies may be completely implemented in one or more circuits or logic elements.

The technologies in this application may be implemented in a wide variety of apparatuses or devices, including a wireless mobile phone, an integrated circuit (IC), or a set (for example, a chip set) of ICs. In this application, various components, modules, and units are described to emphasize functions of an apparatus that is configured to implement the disclosed technologies, and the functions do not necessarily need to be implemented by different hardware units. As described above, various units may be combined in a codec hardware unit or provided by a set of interoperable hardware units (including one or more processors as described above) in conjunction with suitable software and/or firmware.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for decoding an intra-frame prediction mode, comprising:
    parsing a bitstream to obtain a first identifier indicating that an intra-frame prediction mode of a current to-be-decoded unit belongs to a first mode set, wherein the first mode set is a subset of a plurality of preset candidate intra-frame prediction modes, and wherein the first mode set comprises a plurality of intra-frame prediction modes of available neighborhood reconstruction units in preset positions of the current to-be-decoded unit and at least one non-directional prediction mode; and
    parsing the bitstream to obtain a second identifier in response to determining, based on the first identifier, that the intra-frame prediction mode of the current to-be-decoded unit belongs to the first mode set,
    wherein the second identifier indicates a candidate intra-frame prediction mode in the first mode set that is the intra-frame prediction mode of the current to-be-decoded unit, and
    wherein a codeword length of an identifier indicating one of the at least one non-directional prediction mode is greater than a codeword length of an identifier indicating one of the intra-frame prediction modes of the available neighborhood reconstruction units in preset positions of the current to-be-decoded unit.

2. The method according to claim 1, further comprising:
    determining that the intra-frame prediction mode of the current to-be-decoded unit does not belong to the first mode set based on the first identifier;
    obtaining a plurality of candidate intra-frame prediction modes comprising directional prediction modes by sampling at a preset direction interval;
    parsing the bitstream to obtain a third identifier indicating that the intra-frame prediction mode of the current to-be-decoded unit belongs to a second mode set, wherein the second mode set is a second subset of the plurality of preset candidate intra-frame prediction modes, and wherein the second mode set comprises the candidate intra-frame prediction modes comprising directional prediction modes obtained through sampling at a preset direction interval;
    parsing the bitstream to obtain a fourth identifier in response to determining that the intra-frame prediction mode of the current to-be-decoded unit belongs to the second mode set based on the third identifier, wherein the fourth identifier indicates a candidate intra-frame prediction mode of the plurality of candidate intra-frame prediction modes in the second mode set that is used as the intra-frame prediction mode of the current to-be-decoded unit; and
    parsing the bitstream to obtain a fifth identifier in response to determining that the intra-frame prediction mode of the current to-be-decoded unit does not belong to the second mode set based on the third identifier, wherein the fifth identifier indicates a candidate intra-frame prediction mode of a plurality of candidate intra-frame prediction modes excluding the candidate intra-frame prediction modes in the first mode set and the second mode set and that is used as the intra-frame prediction mode of the current to-be-decoded unit.

3. The method according to claim 2, wherein the directional prediction modes are represented by a plurality of prediction directions that are distributed at equal angular intervals between any two directions of 180 degrees on a two-dimensional plane.

4. The method according to claim 2, wherein the candidate intra-frame prediction modes in the second mode set comprise an intra-frame prediction mode that represents an adjacent prediction direction of a directional prediction mode of the first mode set.

5. The method according to claim 4, further comprising:
    determining that the intra-frame prediction mode of the current to-be-decoded unit belongs to the second mode set based on the third identifier; and constructing the second mode set using an intra-frame prediction mode with a first direction interval from the directional prediction mode in the first mode set until a quantity of the candidate intra-frame prediction modes in the second mode set reaches a second preset value, wherein the first direction interval is a non-zero integer.

6. The method according to claim 5, wherein after completing construction of the second mode set and when the quantity of the candidate intra-frame prediction modes in the second mode set does not reach the second preset value, the method further comprises adding an intra-frame prediction mode with an increased first direction interval from the directional prediction mode in the first mode set to the second mode set until the quantity of the candidate intra-frame prediction modes in the second mode set reaches the second preset value, wherein an absolute value of the increased first direction interval is greater than an absolute value of the first direction interval.

7. The method according to claim 5, wherein before constructing the second mode set using the intra-frame prediction mode with the first direction interval from the directional prediction mode in the first mode set, the method further comprises constructing the second mode set using a first non-directional prediction mode, wherein the first mode set excludes the first non-directional prediction mode.

8. The method according to claim 2, wherein a plurality of candidate intra-frame prediction modes in the first mode set are different from each other, and wherein the candidate intra-frame prediction modes in the second mode set are different from each other.

9. The method according to claim 1, wherein the at least one non-directional prediction mode comprises a direct current (DC) mode and a planar mode.

10. The method according to claim 1, wherein the available neighborhood reconstruction units in the preset positions of the current to-be-decoded unit comprise a plurality of neighborhood reconstruction units in preset positions that belong to a common coding unit set as the current to-be-decoded unit and that are for obtaining a predictor through intra-frame prediction.

11. The method according to claim 10, wherein the common coding unit set comprises at least one of a picture, a slice, or a tile.

12. The method according to claim 1, wherein the available neighborhood reconstruction units in the preset positions comprise a reconstruction unit that is directly to a left and adjacent to a lower-left corner of the current to-be-decoded unit, a reconstruction unit that is directly above and adjacent to an upper-right corner of the current to-be-decoded unit, a reconstruction unit in a lower-left adjacent position, a reconstruction unit in an upper-right adjacent position, and a reconstruction unit in an upper-left adjacent position.

13. The method according to claim 12, further comprising:
determining that the intra-frame prediction mode of the current to-be-decoded unit belongs to the first mode set based on the first identifier;
constructing, after determining that the intra-frame prediction mode of the current to-be-decoded unit belongs to the first mode set until a quantity of the candidate intra-frame prediction modes in the first mode set reaches a first preset value, wherein the candidate intra-frame prediction modes in the first mode set are different from each other, a plurality of candidate intra-frame prediction modes in the first mode set, according to the following sequence:
an intra-frame prediction mode of an available reconstruction unit that is directly to the left and adjacent to the lower-left corner of the current to-be-decoded unit,
an intra-frame prediction mode of an available reconstruction unit that is directly above and adjacent to the upper-right corner of the current to-be-decoded unit,
a planar prediction mode,
an intra-frame prediction mode of an available reconstruction unit on the lower left of the current to-be-decoded unit,
an intra-frame prediction mode of an available reconstruction unit on the upper right of the current to-be-decoded unit,
an intra-frame prediction mode of an available reconstruction unit on the upper left of the current to-be-decoded unit, and
a direct current mode.

14. The method according to claim 13, wherein after constructing the first mode set and when a quantity of the candidate intra-frame prediction modes in the first mode set does not reach the first preset value, the method further comprises adding a next intra-frame prediction mode that represents an adjacent prediction direction of a directional prediction mode in the first mode set to the first mode set.

15. The method according to claim 13, wherein the second identifier is a unary code, and wherein, when the candidate intra-frame prediction mode indicated by the second identifier is arranged in a more forward position in the first mode set, a codeword length of the second identifier is shorter.

16. An apparatus for decoding an intra-frame prediction mode, comprising:
a memory comprising instructions; and
a processor coupled to the memory and configured to execute the instructions, which cause the processor to be configured to:
parse a bitstream to obtain a first identifier indicating that an intra-frame prediction mode of a current to-be-decoded unit belongs to a first mode set, wherein the first mode set is a subset of a plurality of preset candidate intra-frame prediction modes, and wherein the first mode set comprises a plurality of intra-frame prediction modes of available neighborhood reconstruction units in preset positions of the current to-be-decoded unit and at least one non-directional prediction mode; and
parse the bitstream to obtain a second identifier in response to determining that the intra-frame prediction mode of the current to-be-decoded unit belongs to the first mode set based on the first identifier, wherein the second identifier indicates a candidate intra-frame prediction mode in the first mode set that is used as the intra-frame prediction mode of the current to-be-decoded unit, and wherein a codeword length of an identifier indicating one of the at least one non-directional prediction mode is greater than a codeword length of an identifier indicating one of the intra-frame prediction modes of the available neighborhood reconstruction units in the preset positions of the current to-be-decoded unit.

17. The apparatus according to claim 16, wherein the instructions further cause the processor to be configured to:
determine that the intra-frame prediction mode of the current to-be-decoded unit does not belong to the first mode set based on the first identifier:

obtain a plurality of candidate intra-frame prediction modes comprising directional prediction modes by sampling at a preset direction interval;

parse the bitstream to obtain a third identifier indicating that the intra-frame prediction mode of the current to-be-decoded unit belongs to a second mode set, wherein the second mode set is a second subset of the plurality of preset candidate intra-frame prediction modes, and wherein the second mode set comprises the candidate intra-frame prediction modes with directional prediction modes obtained through sampling at a preset direction interval;

parse the bitstream to obtain a fourth identifier in response to determining that the intra-frame prediction mode of the current to-be-decoded unit belongs to the second mode set based on the third identifier, wherein the fourth identifier indicates a candidate intra-frame prediction mode of the plurality of candidate intra-frame prediction modes in the second mode set that is used as the intra-frame prediction mode of the current to-be-decoded unit; and parse the bitstream to obtain a fifth identifier in response to determining that the intra-frame prediction mode of the current to-be-decoded unit does not belong to the second mode set based on the third identifier, wherein the fifth identifier indicates a candidate intra-frame prediction mode of a plurality of candidate intra-frame prediction modes excluding the candidate intra-frame prediction modes in the first mode set and the second mode set and that is used as the intra-frame prediction mode of the current to-be-decoded unit.

18. The apparatus according to claim 17, wherein the directional prediction modes are represented by a plurality of prediction directions that are distributed at equal angular intervals between any two directions of 180 degrees on a two-dimensional plane.

19. The apparatus according to claim 16, wherein the at least one non-directional prediction mode comprises a direct current (DC) mode and a planar mode.

20. The apparatus according to claim 16, wherein the available neighborhood reconstruction units in the preset positions of the current to-be-decoded unit comprise a plurality of neighborhood reconstruction units in preset positions that belong to a common coding unit set as the current to-be-decoded unit and that are used to obtain a predictor through intra-frame prediction.

* * * * *